(12) United States Patent
Holcomb

(10) Patent No.: US 10,350,683 B2
(45) Date of Patent: Jul. 16, 2019

(54) MULTIPLE FLUX CONCENTRATOR HEATING

(71) Applicant: Grid Logic Incorporated, Lapeer, MI (US)

(72) Inventor: Matthew J. Holcomb, Metamora, MI (US)

(73) Assignee: Grid Logic Incorporated, Lapeer, MI (US)

( * ) Notice: Subject to any disclaimer, the term of this patent is extended or adjusted under 35 U.S.C. 154(b) by 1321 days.

(21) Appl. No.: 14/502,665

(22) Filed: Sep. 30, 2014

(65) Prior Publication Data

US 2016/0158841 A1 Jun. 9, 2016
US 2018/0369911 A9 Dec. 27, 2018

Related U.S. Application Data

(60) Provisional application No. 61/885,806, filed on Oct. 2, 2013, provisional application No. 61/896,896, filed on Oct. 29, 2013, provisional application No. 61/898,054, filed on Oct. 31, 2013, provisional application No. 61/977,395, filed on Apr. 9, 2014.

(51) Int. Cl.
| | | |
|---|---|---|
| *H05B 6/10* | (2006.01) | |
| *H05B 6/36* | (2006.01) | |
| *B22F 3/105* | (2006.01) | |
| *B33Y 10/00* | (2015.01) | |
| *B33Y 30/00* | (2015.01) | |

(52) U.S. Cl.
CPC ............ *B22F 3/105* (2013.01); *H05B 6/101* (2013.01); *H05B 6/365* (2013.01); *B22F 2003/1051* (2013.01); *B22F 2003/1053* (2013.01); *B33Y 10/00* (2014.12); *B33Y 30/00* (2014.12)

(58) Field of Classification Search
CPC ...... B22F 2003/1051; B22F 2003/1053; B22F 3/105; B33Y 10/00; B33Y 30/00; H05B 6/101; H05B 6/365
USPC .......................................................... 219/603
See application file for complete search history.

(56) References Cited

U.S. PATENT DOCUMENTS

| | | | | |
|---|---|---|---|---|
| 4,087,322 A | | 5/1978 | Marcus | |
| 4,305,784 A | | 12/1981 | Ohkawa | |
| 4,521,659 A | * | 6/1985 | Buckley | ............... B29C 66/954 156/272.4 |
| 5,675,306 A | * | 10/1997 | Diaz | ...................... H01F 38/08 336/145 |
| 5,874,713 A | | 2/1999 | Cydzik | |
| 5,965,282 A | | 10/1999 | Baermann | |
| 6,031,215 A | | 2/2000 | Nanataki et al. | |

(Continued)

FOREIGN PATENT DOCUMENTS

DE 102010038249 4/2012

OTHER PUBLICATIONS

International Search Report and Written Opinion dated Dec. 31, 2014, International Patent Application No. PCT/US14/58389 with International Filing Date of Sep. 30, 2014, (8 pages).

*Primary Examiner* — Dana Ross
*Assistant Examiner* — Joseph W Iskra
(74) *Attorney, Agent, or Firm* — Stephen M. De Klerk

(57) ABSTRACT

A heating method is described. A plurality of flux concentrators and at least one part may be held in proximity to one another. One or more alternating electric current may be generated to generate a plurality of alternating magnetic fields by the respective flux concentrators.

13 Claims, 19 Drawing Sheets

(56) References Cited

U.S. PATENT DOCUMENTS

| | | | |
|---|---|---|---|
| 6,069,479 A | 5/2000 | Taicher et al. | |
| 6,078,781 A | 6/2000 | Takagi et al. | |
| 6,417,754 B1 | 7/2002 | Bernhardt et al. | |
| 6,875,966 B1 | 4/2005 | Barber et al. | |
| 7,038,178 B2 | 5/2006 | Suzuki | |
| 7,723,653 B2 | 5/2010 | Clark et al. | |
| 7,767,941 B2 | 8/2010 | Kagan | |
| 7,864,013 B2 * | 1/2011 | Muelleman | F41B 6/006 336/178 |
| 8,316,683 B2 | 11/2012 | Tomizawa et al. | |
| 8,334,747 B2 | 12/2012 | Matsumoto | |
| 8,382,834 B2 | 2/2013 | Prescott | |
| 8,444,800 B2 | 5/2013 | Nagaura et al. | |
| 8,606,160 B2 | 12/2013 | Nakase et al. | |
| 8,732,939 B2 | 5/2014 | Uchida | |
| 8,738,147 B2 | 5/2014 | Hastings | |
| 2006/0124631 A1 * | 6/2006 | Alfredeen | H05B 6/065 219/635 |
| 2007/0235445 A1 * | 10/2007 | Wilgen | H05B 6/101 219/635 |
| 2012/0329659 A1 * | 12/2012 | Holcomb | B22F 3/00 505/400 |
| 2013/0189385 A1 * | 7/2013 | Zoppas | B29B 13/024 425/3 |
| 2013/0329659 A1 | 12/2013 | Holcomb | |

\* cited by examiner

Spatial dependence of the flux density vs. frequency 0.5mm from the MIS-FC (a)

(b)

(a)

(b)

MULTIPLE FLUX CONCENTRATOR HEATING

CROSS-REFERENCE TO RELATED APPLICATIONS

This application claims priority from U.S. Provisional Patent Application No. 61/885,806, filed on Oct. 2, 2013; U.S. Provisional Patent Application No. 61/896,896, filed on Oct. 29, 2013; U.S. Provisional Patent Application No. 61/898,054, filed on Oct. 31, 2013 and U.S. Provisional Patent Application No. 61/977,399, filed on Apr. 9, 2014, each of which are incorporated herein by reference in their entirety.

STATEMENT REGARDING FEDERALLY SPONSORED RESEARCH OR DEVELOPMENT

Certain aspects of this invention were developed with support from the DARPA (Defense Advanced Research Projects Agency). The U.S. Government may have rights in certain of these inventions.

BACKGROUND OF THE INVENTION

1). Field of the Invention
This invention relates to a sintering apparatus and its use.
2). Discussion of Related Art
It has become common place to fabricate three-dimensional components using Computer Numerical Control (CNC) systems. State of the art solid freeform fabrication (SFF) methods span a number of technologies including stereolithography, 3D printing, selective laser sintering, direct metal deposition, electron beam melting, and microplasma powder deposition. Thermoplastic-based SFF technologies allow designers to verify product design with three-dimensional models at an early stage, but are not capable of fabricating high-strength end products. In principle, metal-based SFF technologies allow for the rapid manufacture of structurally sound, dimensionally accurate metallic parts directly from computer aided design (CAD) models. Laser-based SFF technologies (e.g. DMD and SLS) are highly dependent on specific process parameters to achieve structurally sound parts. These process parameters are specific to the composition, morphology, and materials properties of the metallic powder, as well as the characteristics of the laser beam used to consolidate the powder. Selective Laser Sintering (SLS) and Direct Metal Deposition (DMD) are examples of three-dimensional additive manufacturing systems wherein a high power laser is used to fuse components or particles, such as metal powders or ceramic/metal composite powders, to one another as a means of building up a macroscopic part. These components or particles to be fused may be located in a dense particle bed, as in SLS, or may be entrained in a gas flow and fused in a weld pool on the surface of the part being manufactured, as in DMD. However, in both SLS and DMD technologies, the entire unfused components or particles that comprise the powdered material is heated indiscriminately by the high intensity laser beam. In certain applications, such as when the powdered material includes a ceramic component, the laser may cause thermal decomposition of the ceramic part resulting in the degradation of the physical characteristics of the macroscopic part.

SUMMARY OF THE INVENTION

The invention provides a method including holding a plurality of flux concentrators and at least one part in proximity to one another, generating at least a first alternating electric current to generate a plurality of alternating magnetic fields by the respective flux concentrators, each alternating magnetic field heating a respective region of the at least one part to create a phase change in the region and moving the flux concentrators in unison relative to the at least one part to create trailing paths of the regions that overlap one another.

The invention also provides a heating apparatus including a holder capable of holding at least one part, an electric current generator generating at least a first alternating electric current, a plurality of flux concentrators electrically connected to the electrical current generator, the at least first alternating electric current driving the flux concentrators so that the flux concentrators generate a plurality of respective alternating magnetic fields, each alternating magnetic field heating a respective region of the at least one part to create a phase change in the region and a movement imparting device, the flux concentrators being mounted to the movement imparting device, the movement imparting device causing relative movement of the flux concentrators on the holders so that the flux concentrators move in unison relative to the at least one part to create trailing paths of the regions that overlap one another.

BRIEF DESCRIPTION OF THE DRAWINGS

The invention is further described by way of example with reference to the accompanying drawings, wherein.

DETAILED DESCRIPTION OF THE INVENTION

Induction Heating of Fine Metal Powders

Micro-Induction Sintering (MIS) is a new additive manufacturing process described herein in which a metallic powder is consolidated via high frequency induction heating. Unlike laser- or electron beam-based additive manufacturing techniques in which the metal powder is heated indiscriminately by an external energy source, the MIS technique allows for the selective heating of individual particles by tailoring the frequency of an applied magnetic field. A localized high frequency magnetic field is produced at the powder bed using a specifically designed flux concentrator (FC) system.

Figure 1:
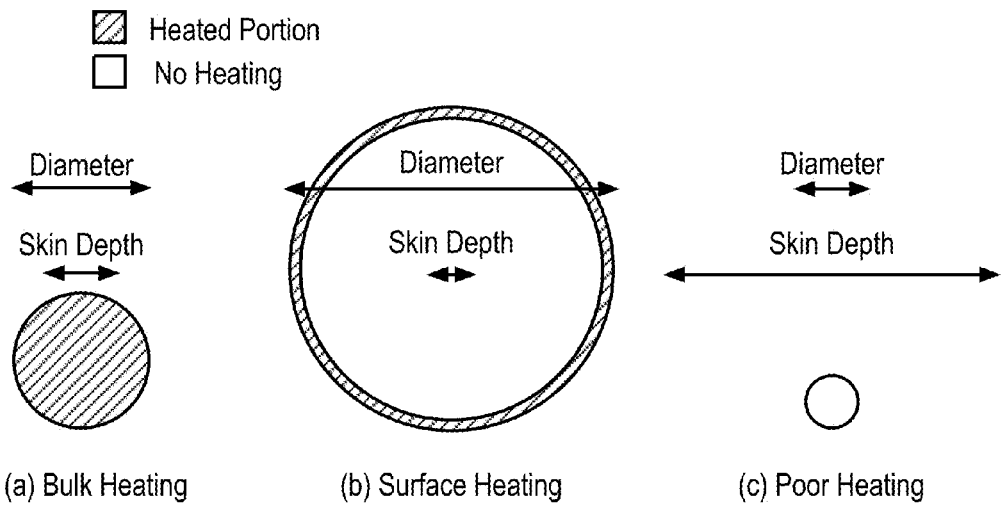
FIGS. 1a, b and c illustrate the effect of skin depth on the manner in which a small particle is heated.

Heating of metallic particles by induction is a result of both Joule heating due to eddy currents in non-magnetic metallic particles and hysteresis loss in magnetic particles, both of which result from the application of a high frequency magnetic field. For non-magnetic metals, eddy currents flow within a certain distance from the surface of the material. The distance within the metal at which the eddy current is reduced to approximately 37% of the value at the surface is called the skin depth δ and can be written as, $$\delta = \sqrt{\frac{\rho}{\pi f \mu}} \quad [1]$$

where ρ is the resistivity and μ is the permeability of the material, and f is the selected frequency of the magnetic field. In order to heat a metal particle by induction, it is important to immerse the particle in a high frequency magnetic field such that the skin depth is less than one half the diameter of the particle. As shown in FIG. 1a, the dimension of the particle is approximately 2δ. In this case, the eddy currents penetrate deep into the particle and bulk heating occurs by induction. In FIG. 1b, the dimension of the part is much larger than δ. Here, only the surface of the part is heated via induction. In FIG. 1c, the skin depth is much larger than the dimension of the part and the eddy currents largely cancel in the particle. In this case, the part does not couple well to the alternating magnetic field and the material absorbs very little power.

For simple shaped (e.g. flat or cylindrical) materials placed in a uniform alternating magnetic field, the power absorbed by the part ($P_w$) can be written as:

$$P_w = \frac{\rho}{\delta} A K H^2 = A K H^2 \sqrt{\pi f \mu \rho} \quad [2]$$

where ρ is the resistivity of the material, δ is the skin depth, A is the surface of the part exposed to the magnetic field, K is a power transfer factor that depends on a geometry of the part relative to the applied magnetic field, and H is the magnetic field strength. In principle, it is possible to calculate the power absorbed by a given metallic part in an induction heating process using modern finite element analysis methods. As a rule of thumb, with a fixed resistivity, magnetic permeability, and part dimensions, the power absorbed by the part in an induction heating process increases with increasing frequency and magnetic field strength.

Figure 2:
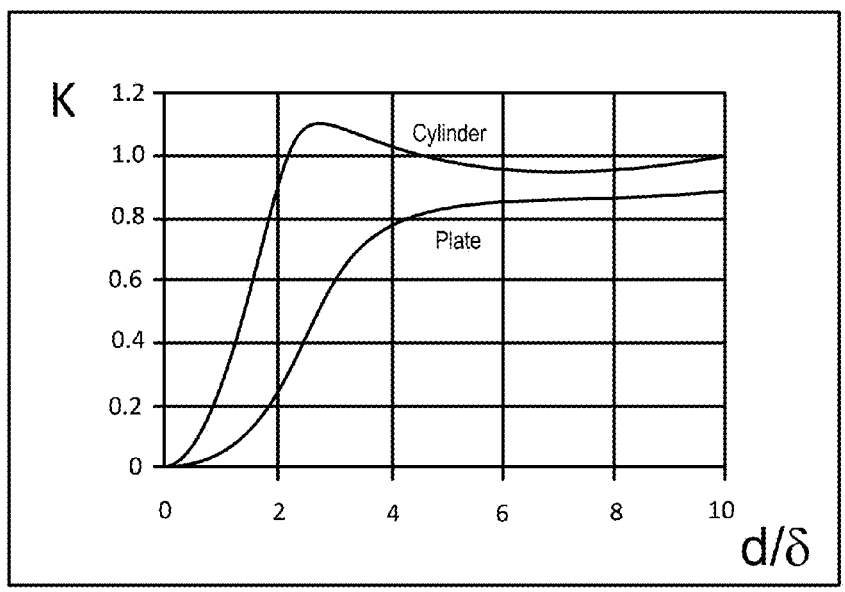
FIG. 2 is a graph showing power transfer factor as it depends on "electrical dimension"

In equation [2], the only ill-defined quantities are A and K, which describes how well the high-frequency magnetic field couples to an individual part. For a given component geometry and form factor of the applied AC magnetic field, A can be calculated. The power transfer factor K, on the other hand, depends on the "electrical dimension" of the part being heated, which is defined as the ratio of the diameter (outside dimension) of the part to the skin depth, d/δ. This is shown in FIG. 2 for two limiting cases of a plate and a cylinder. In the plate geometry, for example, the power transfer factor K has a maximum for d/δ of approximately 3. In order to maximize the total transfer of power to the part, however, the "electrical dimension" of the part must be as low as possible while still maintaining a large K. In general, the maximum power transfer to bulk heat cylinders or plates is achieved when d/δ is approximately 4. This illustrates the critical relationship between the dimension of the part to be heated by induction and the frequency of the magnetic field.

Figure 3:
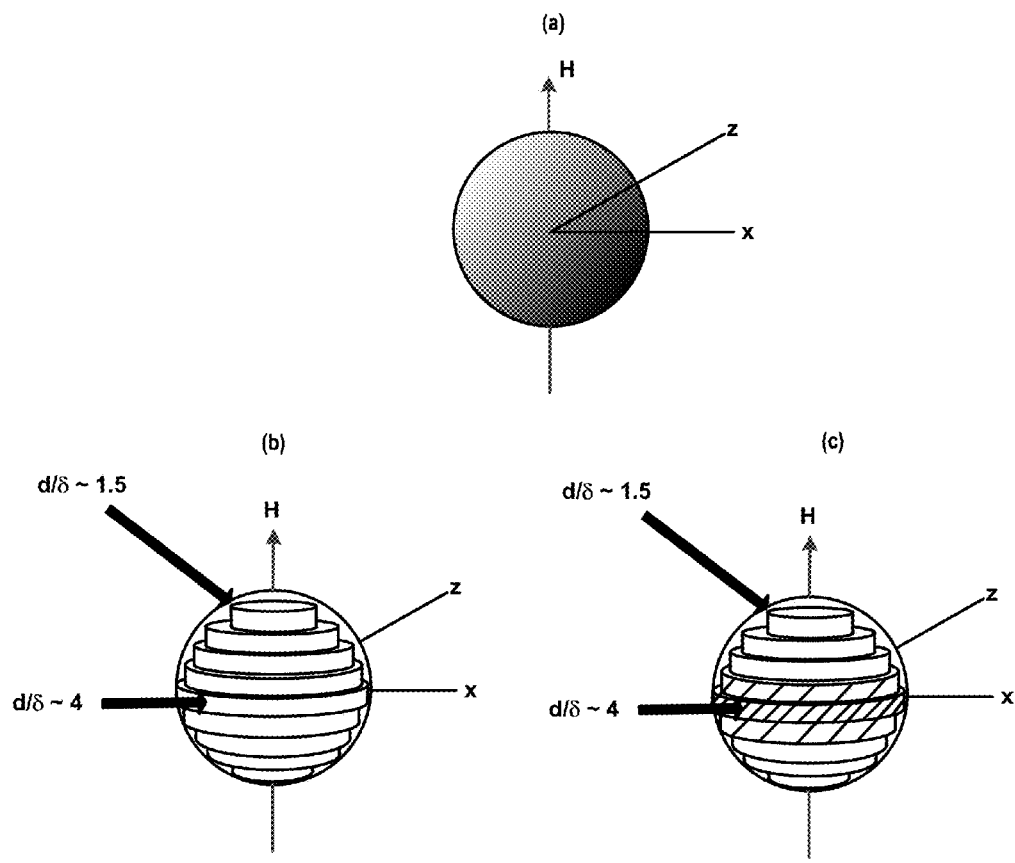
FIGS. 3a, b and c are perspective views of a metallic sphere wherein the "electrical dimension" is not fixed.

Unlike plates or cylinders, metal powders typically used in additive manufacturing processes consist of spherical particles. Consider a metallic sphere immersed in a high frequency magnetic field as shown in FIG. 3a. In this case, the "electrical dimension" of the sphere is not fixed. This results in an additional frequency dependent component to K for spherical metal powders. To illustrate, consider the approximation to the spherical particle shown in FIG. 3b, which consists of a stack of circular plates with diameters that inscribe the surface of a sphere. Each circular plate is at right angles to a magnetic flux field line H forming an axis of the sphere. Within each layer in this approximation, the K for plates shown in FIG. 2 can be used to describe the efficiency of power transfer. For a fixed frequency such that d/δ=4, where d is the particle diameter, the power transfer factor is large and bulk heating of the plate occurs because the eddy currents flow around the perimeter and penetrate deep within the plate. As the effective diameter decreases towards the "poles" of the sphere, however, the "electrical dimension" of each plate decreases and the effective K decreases to zero. This means, that for a fixed induction heating frequency, the "equator" of the particle is heated, but the "poles" do not couple well to the applied magnetic field and are only heated by thermal conduction within the material. This is shown schematically in FIG. 3c where thicker cross-hatching at the equator of the sphere indicates the inhomogeneous heating of the spherical particle by induction for magnetic field frequencies such that d/δ=4.

Figure 4:
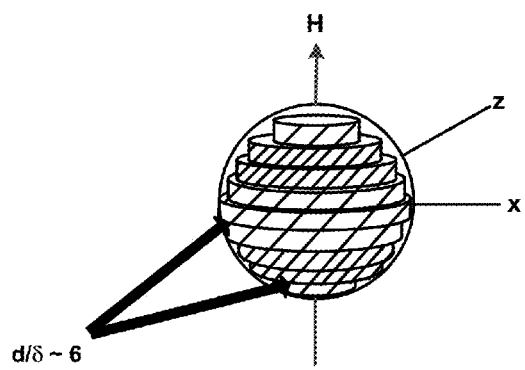
FIG. 4 is perspective view of a metallic sphere wherein the "electrical dimension" is fixed.

The effective heating of spherical particles can be achieved by selecting the frequency of the applied magnetic field to maximize the overall power transfer to the particle. This is illustrated in FIG. 4, where the frequency is fixed such that d/δ~6. In this case, the power transfer factor is large above and below the "equator" and bulk heating of the "tropic" plates occurs because the eddy currents flow around the perimeter and penetrate deep within the plate. At the "equator", K is still large and d/δ is larger than 6, which results in the surface heating of the spherical particle at and near the equator in addition to the bulk heating at the "tropics".

In general, the reduced effective diameter near the "poles" of the spherical particle will require higher induction frequencies to cause bulk heating of the entire particle. It is estimated that the "electrical dimension" appropriate for the efficient heating of spherical metal particles will be between 4 and 8. The determination of the frequency dependent K appropriate for the bulk heating of spherical metal powders is of critical importance to the MIS additive manufacturing method. A detailed model of K for a sphere will guide the continued design of power supplies for the MIS flux concentrator.

Induction Heating of Composite Powders

Equations [1] and [2], along with the functional dependence of K(d/δ), provide a powerful toolbox for the selective heating of individual particles in composite materials. This is a distinctive advantage of the MIS method over competing metal-based additive manufacturing techniques such as selective laser sintering (SLS) and electron beam deposition (EBD). Here, we describe two conceptual composite architectures with an emphasis on the selective heating of individual components of the composite during the consolidation process.

Figure 5:
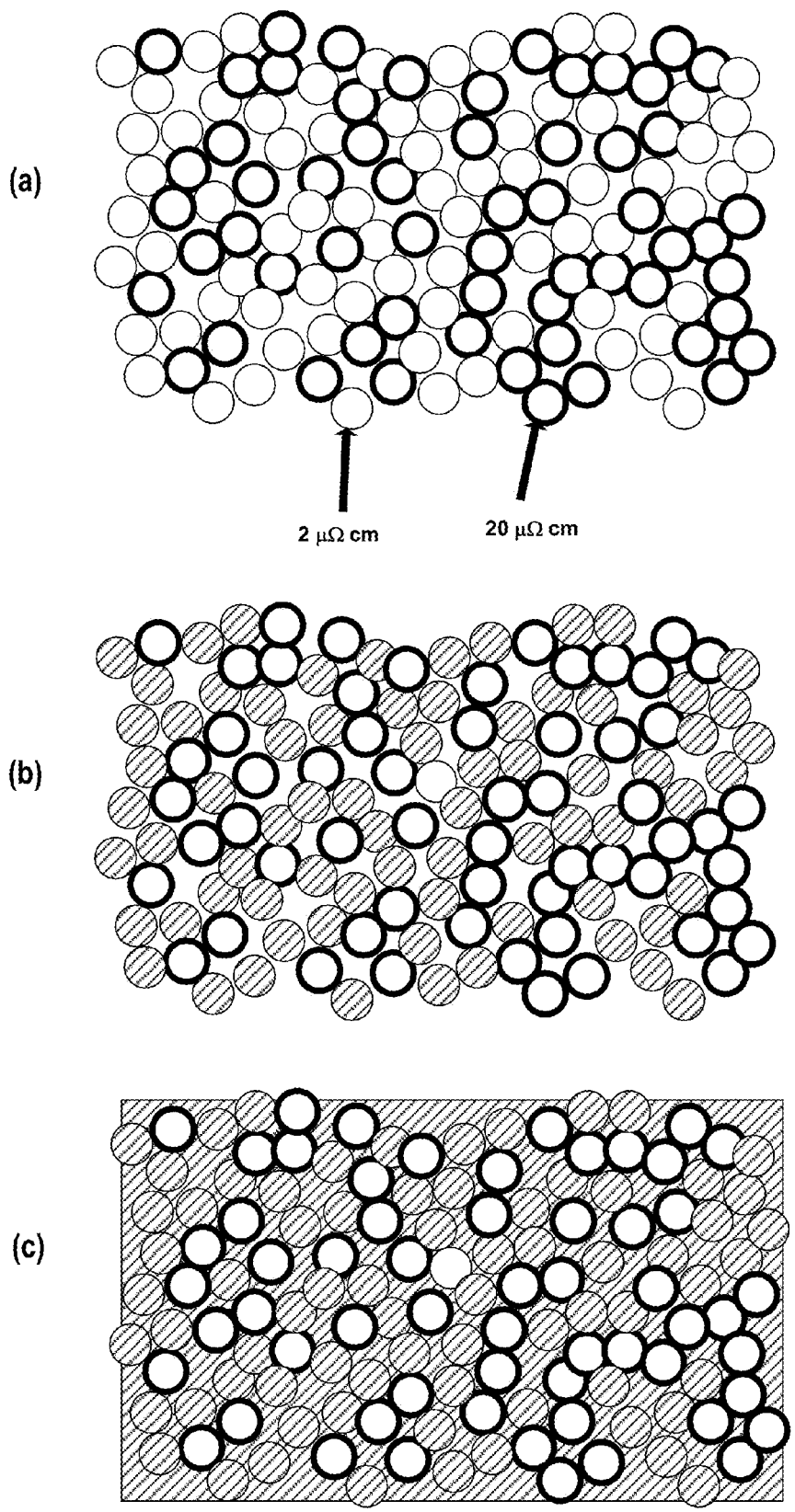
FIGS. 5a to c are plan views illustrating the application of micro-inductive sintering (MIS) technology on an ideal mixture of mono-disperse metal powders.

FIGS. 5a to 5c illustrate the application of MIS technology to an ideal mixture of mono-disperse metal powders. In FIG. 5a, it is seen that this mixture consists of two different materials (represented as solid circles and empty circles) with approximately the same particle size, but with different materials properties. In this example, the resistivity ρ of the grey particle is 10 ten times greater than the resistivity of the blue particle. Assuming that bulk heating of the particles occurs when d/δ is approximately 6 the ideal induction frequency can be written as, $$f = \frac{36\rho}{\pi\mu d^2} \quad [3]$$

where d is the diameter of the particle. Thus, for a given particle size and magnetic permeability, the ideal induction frequency to achieve bulk heating of a particle scales linearly with the resistivity of the material. In this case, the thin circle particles can be selectively heated in bulk using an oscillating magnetic field with a frequency 10 times smaller than that which would be used to bulk heat the thick circle particles. This is illustrated in FIG. 5b, which explicitly shows the selective heating of the thin circle particles. Note that the thick circle particles are also heated in this process, but only by conduction and convection heating that results from the selective induction heating of the thin circle particles. FIGS. 5a to 5c depict the heating of the thin circle particles in this example because the frequency of the magnetic field is set such that the "electrical dimension" at the "tropics" of the spherical particle is approximately 4. Referring to equation [1], the skin depth of the thick circle is approximately √10 ~3.2 times that of the thin circle particle at this frequency, as described with reference to FIG. 1c. Since the skin depth in the thick circle particle is much larger than the particle diameter, there is very poor coupling to the high frequency magnetic field and these particles are not heated directly by induction.

In this example, the consolidation of the composite is driven by the selective sintering of the thin circle particles, with the thick circle particles remaining as inclusions in the solid. This is illustrated in FIG. 5c that shows the consolidation of the thin circle particles with isolated thick circle particles in the composite. Note that upon consolidation of the thin circle particles, the effective domain size of the thin circle material increases and the high frequency magnetic field tuned to the initial size of the thin circle particles no longer couples well to the thin circle material. In this case, the effective particle size is much larger than the skin depth at this frequency and the entire consolidated domain is heated at the surface as depicted schematically in FIG. 1b.

The coupling and de-coupling of the high frequency magnetic field based on the domain size of the metallic material allows for real-time diagnostics of the MIS consolidation process through the monitoring of the forward and reflected power to the powder bed. In addition, it allows for the rapid and automatic de-coupling of the external heat source (i.e. the high frequency magnetic field) upon consolidation of the particles. This is an important control feature in the consolidation of heat sensitive materials or composite materials that may degrade upon exposure to elevated temperatures.

Figure 6:
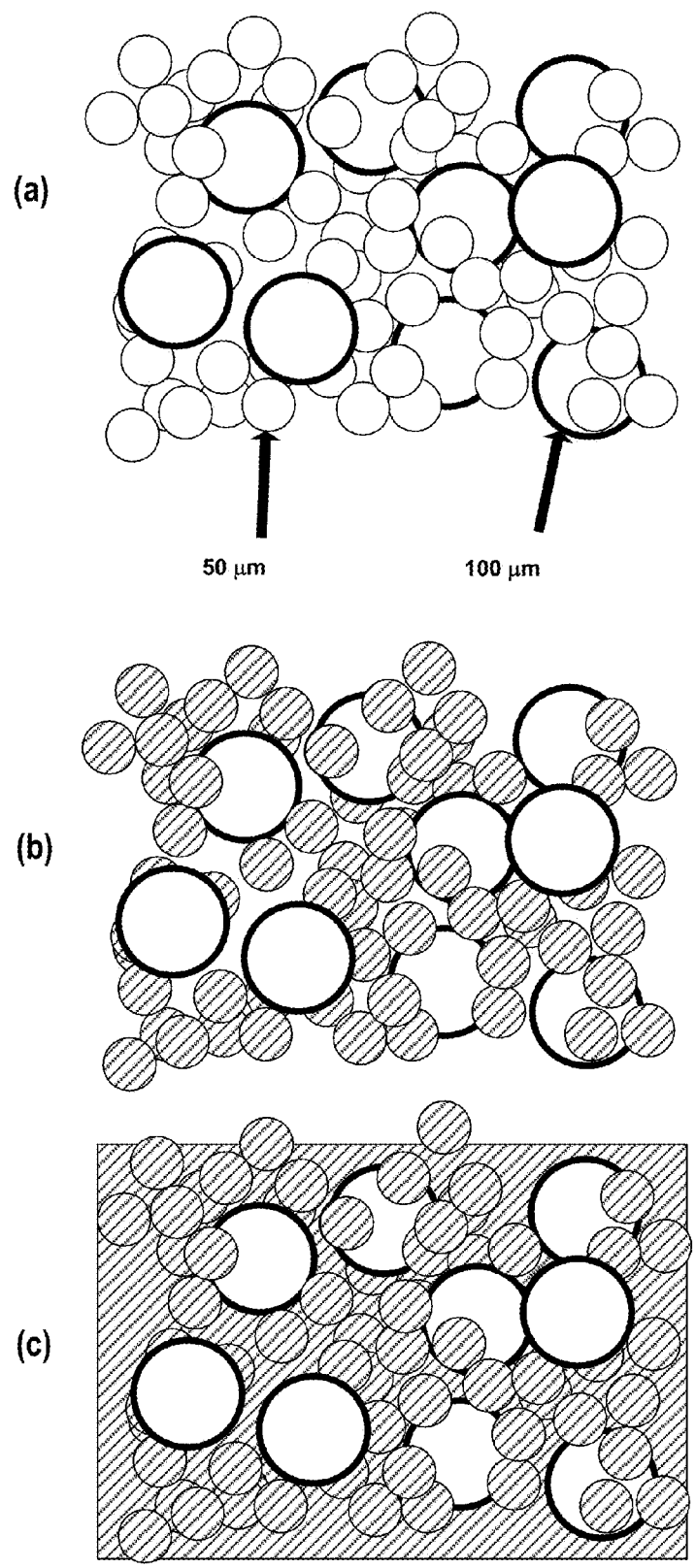
FIGS. 6a, b and c illustrate the application of MIS technology on a bi-modal distribution of particles.

The previous example illustrates the selectivity that the MIS process has with powders that possess similar particle size distributions, but different materials properties. Here, we illustrate the selectivity of the MIS process simply based on the size of the particles in the powder. Consider the ideal metal powder shown in FIG. 6a, which consists of a bimodal distribution of particles with the larger of the two particles being approximately twice the diameter of the smaller particles. Again, the smaller particles can be selectively heated by the ideal induction frequency defined by equation [3], where it is seen that the ideal induction frequency varies as $d^{-2}$. Thus, a twofold increase in particle size implies a fourfold decrease in the frequency of the oscillating magnetic field necessary to achieve bulk heating. FIG. 6b illustrates the bulk heating of the smaller particles and the surface heating of the larger particles that is characteristic of the MIS process using narrow bandwidth fixed frequencies, with complete consolidation shown in FIG. 6c. As in the previous example, upon consolidation of the particles, the effective domain size of the material increases and the high frequency magnetic field tuned to the initial diameter of the smaller particles becomes de-coupled from the consolidated material and the entire domain is heated by induction only at the surface.

In the composite architectures described above, the frequency of the induction heating process is used to selectively heat specific components of the composite based on the physical or materials characteristics of the powder. In the previous example, the small particles are selectively heated by induction, which results in the consolidation of the material. By changing the frequency of the magnetic field, however, the large particles could have been selectively heated by induction, which may lead to an improved density of the final part. In practice, the specific sintering characteristics of the material will determine the operating frequency and bandwidth of the MIS flux concentrator.

General Aspects of the MIS Process

Micro-Induction Sintering is a unique additive manufacturing process capable, in principle, of producing complex parts and components directly from advanced metal and ceramic/metal matrix composite powders. The MIS process, however, is not without limitations imposed by the radio frequency (RF) power electronics, the electrical characteristics of the flux concentrator, the specific sintering characteristics of the metallic powders, and the fundamental physics of induction heating. In general, the MIS process is viable within the following approximate operational parameters:
 1) Materials with electrical resistivities between 1 μΩ cm and 400 μΩ cm.
 2) Powders with particle sizes between 1 μm and 500 μm.
 3) MIS-FC operational frequencies between 0.5 MHz and 3 GHz.

Figure 7:
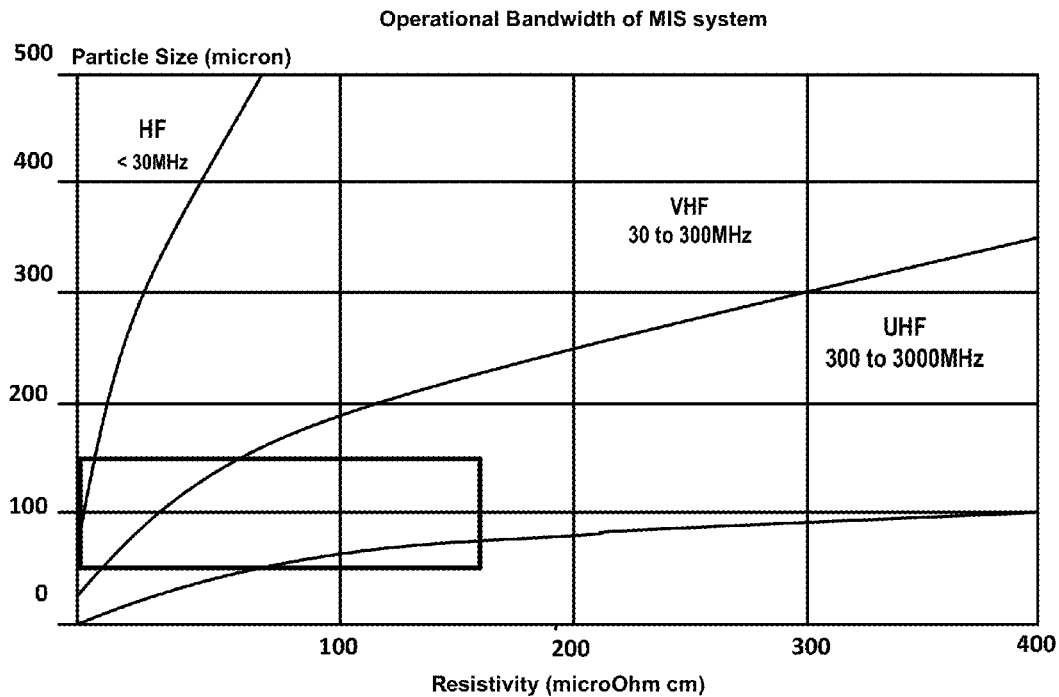
FIG. 7 is a graph illustrating the operational bandwidth of an MIS system.

Using this parameter space and equation [3], the operative phase space for the bulk heating of powders by high frequency induction can be determined. FIG. 7 illustrates the operational frequencies of the MIS system as a function of particle size and resistivity. There are three primary operational frequency bands show in the Figure:
 1) High Frequency (HF)—frequencies less than 30 MHz and greater than 0.1 MHz.
 2) Very High Frequency (VHF)—frequencies greater than 30 MHz and less than 300 MHz.
 3) Ultra High Frequency (UHF)—frequencies greater than 300 MHz and less than 3 GHz.

The vast majority of materials used in additive manufacturing processes possess particle size distributions ranging between 50 μm and 150 μm with electrical resistivities less than 100μΩ cm. This operational space is highlighted by the box in FIG. 7, which shows that most materials can be heated by the MIS process in the VHF and UHF bands. Any material that falls below the UHF band is not a practical candidate for the MIS process based on the operational parameters listed above.

Figure 8:
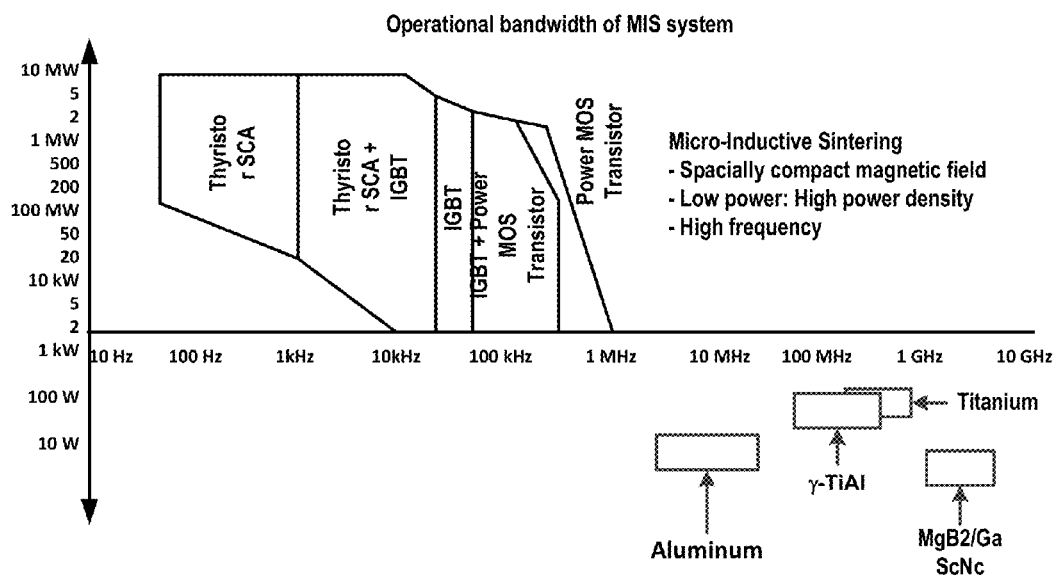
FIG. 8 is a graph illustrating the frequencies and power of commercially available power supplies and the frequencies and power required for MIS technology.

FIG. 8 shows a general list of commercially available power supplies for induction heating systems is shown in FIG. 8, where it is seen that the vast majority of commercial systems operate at frequencies less than 1 MHz and possess power levels up to 10 MW. In contrast, the heating and subsequent consolidation of fine metal powders requires a power supply with a bandwidth from greater than 1 MHz to nearly 5 GHz at power levels up to a few hundred watts. The highlighted areas in FIG. 8 shows the operating specifications of the power supply suitable for the MIS process based on commercial particle size distributions and the electrical properties of the materials. Note that the frequencies required to heat and sinter fine metal and ceramic/metal matrix powders using MIS are 10 to 1000 times higher than conventional induction heating frequencies.

The Evolution of the Flux Concentrator

A central component in the MIS additive manufacturing system is the flux concentrator. This component focuses a high frequency magnetic field into a spatially compact region on a powder bed, resulting in the rapid joule heating of the individual metallic particles and subsequent sintering and consolidation.

Based on MIS-FC concepts that are modeled on a 3D computer aided design (CAD) platform and include advanced 3D magnetic field calculations at both DC and MHz frequencies and models that incorporate the measured physical properties of the material used to fabricate the MIS-FC. The following characteristics for a flux concentrator suitable for the MIS process:
 1) 1 mT magnetic flux density at 0.5 mm distance
 2) Induction heating spatial resolution of approximately 1 mm
 3) Operating frequencies from 0.5 MHz to approximately 3 GHz, preferable at least 1 MHz.
 4) A coil having a diameter of less than 10 mm.
 5) Inductance of less than approximately 10 nH, preferably less than 5 nH These performance characteristics not only determine the final configuration of the MIS-FC, but also the appropriate power supply for the MIS system.

The approach at the beginning of the development effort involved the use of magneto-dielectric materials and high amp-turn conductors to generate a localized, high frequency magnetic field at the air gap of the magnetic circuit. In general, the flux concentrators fabricated and tested along this path consisted of various permutations of the "horse shoe" design and the "pointed cylinder" design.

In our "horse shoe" shaped flux concentrators, a high current conductor that is located in the "yoke" of the "horse shoe" induces magnetic flux in the magneto-dielectric material. In this geometry, the flux density is increased as the cross-sectional area of the "horse shoe" arms decreases near the air gap in the magnetic circuit. At the air gap, the flux density "spills" out of the magneto-dielectric material and forms a localized high frequency magnetic field. The shape and magnitude of this high frequency magnetic field is determined by the shape of the "horse shoe" FC near the air gap, the amplitude of the current passing through the "yoke", and the electromagnetic properties of the magneto-dielectric material. In general, this FC configuration could achieve the target flux densities only at very high amp-turns. By increasing the number of turns through the "yoke", it was possible to significantly increase the flux density at the air gap and reduce the power requirements of the RF amplifier. Unfortunately, the increased number of turns in the "yoke" dramatically increased the inductance of the FC. This high inductance resulted in a MIS-FC with limited bandwidth that required a sophisticated multi-stage matching network. This approach was abandoned after we determined that the required flux densities could only be achieved at frequencies less than 100 MHz with very high RF power levels (e.g., greater than 500 W).

In our "pointed cylinder" shaped flux concentrators, several turns of a low current conductor wrapped around the cylindrical portion of the FC induces magnetic flux in the magneto-dielectric material. Similar to the "horse shoe" FC, the flux density is increased in this geometry as the cross-sectional area of the conical portion of the cylinder decreases near the very large air gap in the magnetic circuit. Near the point of the FC, the flux density "spills" out of the magneto-dielectric material and forms a localized high frequency magnetic field. The shape and magnitude of this high frequency magnetic field is determined by the shape of the cone, the amp-turns of the solenoid around the cylindrical portion of the FC, and the electromagnetic properties of the magneto-dielectric material. Overall, this FC configuration could achieve the target flux densities at modest currents. Unfortunately, this configuration has a very high inductance, which again resulted in a MIS-FC with limited bandwidth that required a sophisticated multi-stage matching network. In addition, we determined that the majority of the power from the RF amplifier was dissipated in the magneto-dielectric material through hysteresis. The magneto-dielectric material heated to approximately 400° C. after 30 seconds of 25 W RF power. This approach was abandoned after we determined that it was nearly impossible to keep the magneto-dielectric material cool during the MIS process.

In addition to these fundamental technical issues with the magneto-dielectric flux concentrators, we determined that the MIS of ScNc materials requires induction heating frequencies well in excess of 100 MHz. After an extensive search for high frequency magneto-dielectric material candidates, we established that no high permeability, low loss materials exist that are suitable for operation in an MIS flux concentrator. In the end, the technical push to VHF and UHF bands for the MIS of ScNc materials ultimately lead to the complete elimination of the magneto-dielectric material in the MIS-FC.

Air-Core Flux Concentrators

In our air-core flux concentrators, a high current conductor is shaped into a coil and the turns in the coil form a localized magnetic field. Early versions of the air-core flux concentrator were simply the "pointed cylinder" flux concentrator without the magneto-dielectric material. The removal of the magneto-dielectric material from the conical coil FC resulted in a significant decrease in the inductance of the FC, as well as a large decrease in the flux density at the "tip" of the coil. The shape and magnitude of this high frequency magnetic field is determined by the shape and amp-turns of the conical coil. Overall, this FC configuration could achieve the target flux densities only at high currents. Unfortunately, the magnetic field produced by the current in the turns that are far from the "tip" of the conical coil do not contribute much flux density at the "tip". This lead to the development of the "pancake" coil in which there are only two turns in the flux concentrator. This configuration resulted in the highest flux density per amp-turn at that time. In order to achieve the required flux densities, we determined that any air-core FC must be energized through a high frequency tank circuit. These circuits consist of a bank of capacitors in parallel to the inductive flux concentrator. This approach was successful and established our design trend for future MIS flux concentrators, which is characterized by a resonant tank circuit with an inductive FC that has the lowest inductance possible. In other words, a MIS-FC with a single turn.

Figure 9:
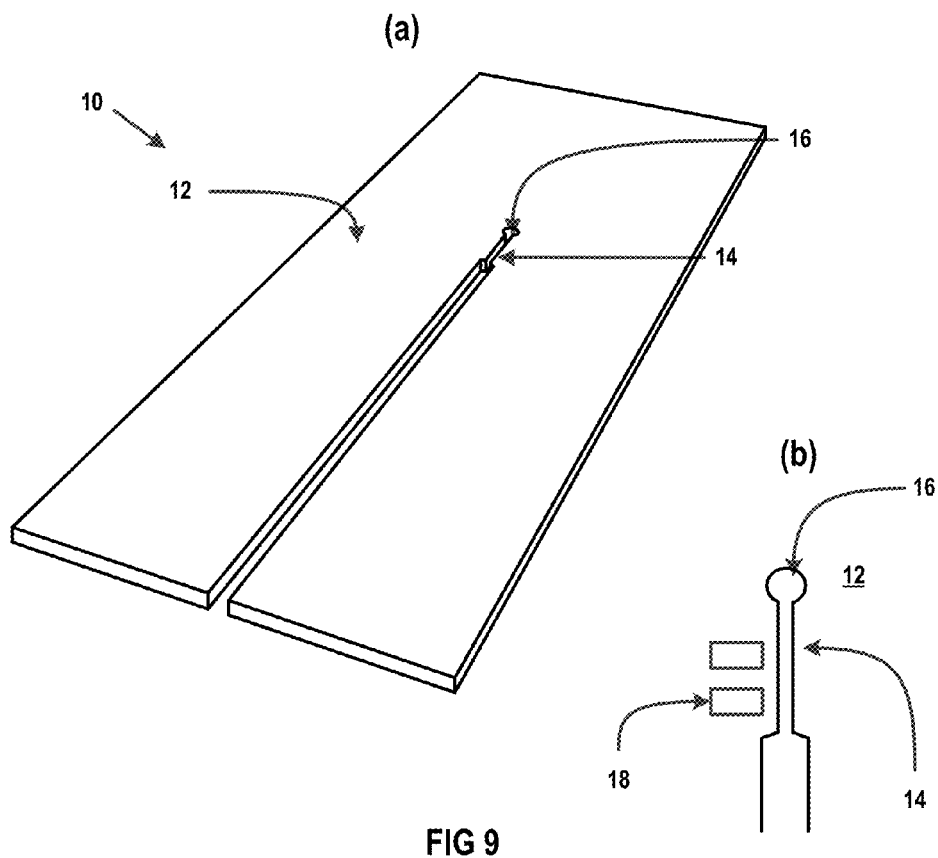
FIGS. 9a and b are perspective and plan views, respectively, of a flux concentrator according to an embodiment of the invention.

FIGS. 9a and 9b show an MIS-FCT air-core flux concentrator 10, according to an embodiment of the invention, that is fabricated from a 1 mm thick copper plate and that has a thin 0.25 mm slot 14 with a 1 mm diameter hole 16 at the end. The hole 16 is a single turn inductor with an inductance of approximately 1 to 1.5 nH, which is over 100 times lower inductance than previous MIS-FC geometries. This novel MIS-FC design concentrates the magnetic flux density within the hole 16 in the plate 12 with the appropriate placement of capacitors 18, and has several features that are ideal for use at very high frequencies. In particular, the very small inductance and parasitic capacitance allows for operation at frequencies well in excess of 1 GHz—over 2000 times higher frequencies than conventional RF induction heating. As will be shown, this is of critical importance for the MIS of metallic powders that consist of very small particles. Further, the solid-state design allows for the efficient removal of heat generated around the FC and the spatial resolution of the MIS process is determined by the diameter of the single turn inductor in the copper plate. The inductor formed by the hole 16 and capacitor 18 are in parallel in this configuration and thus form a very high frequency, micro-miniature induction heating tank circuit. The resonant frequency of the high frequency, micro-miniature tank circuit is determined by the inductance of the MIS-FC and the capacitance of the capacitor bank in parallel to the MIS-FC. The capacitance of the capacitor bank is a sum of the individual capacitances of the capacitors in parallel to the MIS-FC. The inductance of the MIS-FC is proportional to the area enclosed by the current loop that flows around the MIS-FC. Thus, the inductance is the sum of the inductance from the slot 14 and the circular loop 16, which comprises the MIS-FC. The slot inductance can be minimized by placing the capacitors very close to the circular loop 16, or by decreasing the width of the slot such that the area of the slot 14 between the capacitor bank and the circular loop 16 is much smaller than the area of the circular loop 16. In this manner, the inductance of the MIS-FC is primarily due to the inductance of the circular loop.

Figure 10:
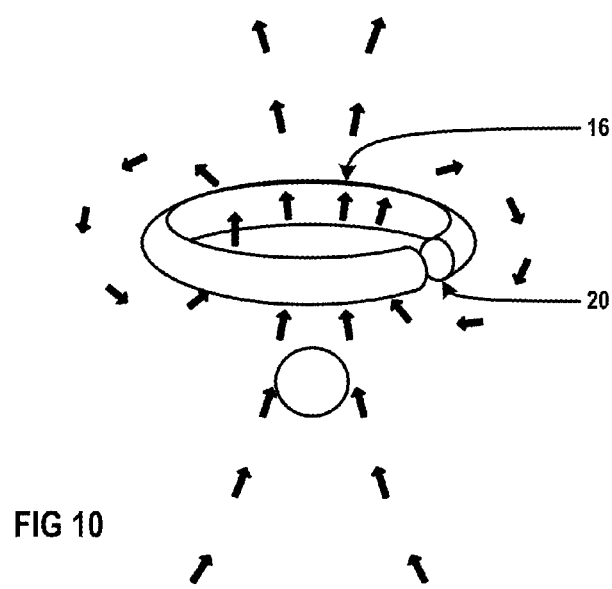
FIG. 10 is a perspective view illustrating a toroidal shape of magnetic flux lines that are created by a coil formed by a hole of the flux concentrator.

The MIS-FC circuit is driven by COTS RF amplifiers (ENI 3100L, Amplifier Research 100W1000B, or Milmega AS0825) with an output impedance of 50Ω and operating bandwidth from 250 kHz up to 2.5 GHz. These amplifiers are driven by a high frequency function generator (Rohde & Schwartz SMIQ03) capable of producing a swept high frequency sine wave from 300 kHz to 3.3 GHz. The amplifier is connected directly to the MIS-FC assembly via a high-power SMA cable. As shown in FIG. 10, the hole 16 forms a magnetic field with inner flux lines 20 that define a toroidal shape. The magnitude of the magnetic field changes as the magnetic flux changes in response to the alternating electric current. The flux lines 20 form circles with an edge of the hole 16 forming the coil that passes through centers of the circles. The part is preferably approximately 50 percent, e.g. between 45 percent and 55 percent, of a diameter of the coil from the coil. Closer than 50 percent results in more heating but less resolution. Further than 50 percent results in a dramatic drop-off of field strength but increased resolution.

MIS Tank Circuit

Figure 11:
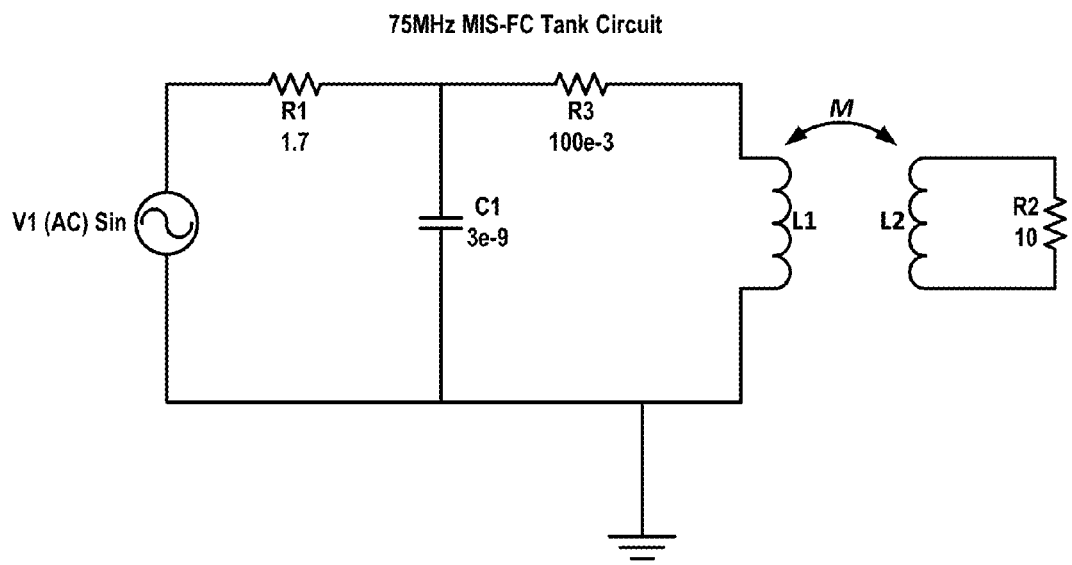
FIG. 11 is a circuit diagram that includes a tank circuit that is used for the flux concentrator.

The circuit diagram for a 75 MHz MIS-FC is shown in FIG. 11. This circuit is based on a parallel resonant tank circuit design that is typically used in induction heating power supplies. In this circuit diagram, however, the degree of coupling between the MIS-FC and the powder is explicitly described by the mutual inductance, M. Here, M is a function of the surface area of the particles exposed to the high frequency magnetic field and the skin depth of the metallic powder at the resonant frequency of the circuit. If the MIS-FC is too distant from the metal powder, or the skin depth is much larger than the particle size, M will tend to zero and the only load in the tank circuit will be due to the intrinsic AC resistance R3 of the copper of the plate 12. Reactive current in the tank portion of the circuit (i.e. between the capacitor and the MIS-FC inductor) is sharply peaked at the resonant frequency, which can be shown to be, $$f_R = \frac{1}{2\pi\sqrt{LC}} \quad [4]$$

where L is the inductance of the MIS-FC (L1 coil) and C is the capacitance of the capacitor bank (C1) in parallel to L. The capacitors of the capacitor bank collect charge and release the charge to the MIS-FC. A plurality of capacitors are mounted in parallel to the plate 12. At $f_R$, very large reactive currents flow between the capacitor bank and the MIS-FC, but the only power dissipated in the circuit is due to the resistive loss in R1 and R3 when K is zero. With a non-zero M, increased power is drawn from the power supply as power flows to the metal powder bed, R2. In general, the magnitude of these resistive and reactive currents depends on the voltage available from the RF power supply and the reactive current available from the capacitor at $f_R$. The MIS-FC tank circuit minimizes the power draw from the RF amplifier by operating near the resonant frequency at all times. A large coil would result in high inductance. High inductance would reduce resonance frequency for a fixed capacitor bank. A reduction in resonance frequency would result in a larger skin depth, which results in a larger outer dimension.

This circuit design not only maximizes the current flow to the MIS-FC, but also is critical to the potential real-time diagnostic features of the MIS process. If the resonant frequency of the circuit does not couple well with the particle size distribution of the powder (see Equations [1] and [2]), then there is a reduced resistive load in the circuit, which corresponds to the case where M is equal to zero. If the resonant frequency of the circuit couples well with the particle size distribution of the powder (i.e. M~1), however, an additional resistive load is introduced in the circuit and increased power will be drawn from the amplifier. In principle, this increased power will flow in the circuit only when the induction heating frequency (i.e. $f_R$) is such that the "electrical dimension" d/δ is approximately 4 to 6 (Assuming spherical particles and an ideal "electrical dimension" of 6 for the maximum power transfer to a sphere.). The frequency dependence of the real power provided by the RF amplifier using this circuit design can be directly related to the real-time diagnostics and qualification of the MIS method.

A convenient method to determine the power transfer from a source to a load is to measure the Voltage Standing Wave Ratio (VSWR) of a device under test (DUT). In this case, the DUT is the MIS-FC. The VSWR is a measure of the amplitude of the reflected RF wave relative to the incident RF wave between an RF power supply and a DUT. In general, the VSWR can be calculated by measuring the reflection coefficient F of a DUT, which can be written as, $$\Gamma = \frac{V_{reflected}}{V_{incident}} \quad [5]$$

where $V_{reflected}$ and $V_{incident}$ are the voltage of the reflected and incident waves, respectively. Using this definition of F, the VSWR can be written as, $$VSWR = \frac{1 + |\Gamma|}{1 - |\Gamma|} \quad [6]$$

where |Γ| is the absolute value of Γ. As Γ is always between 0 and 1, the VSWR has a minimum of unity, which corresponds to 100% power transferred from the source to the load.

Figure 12:
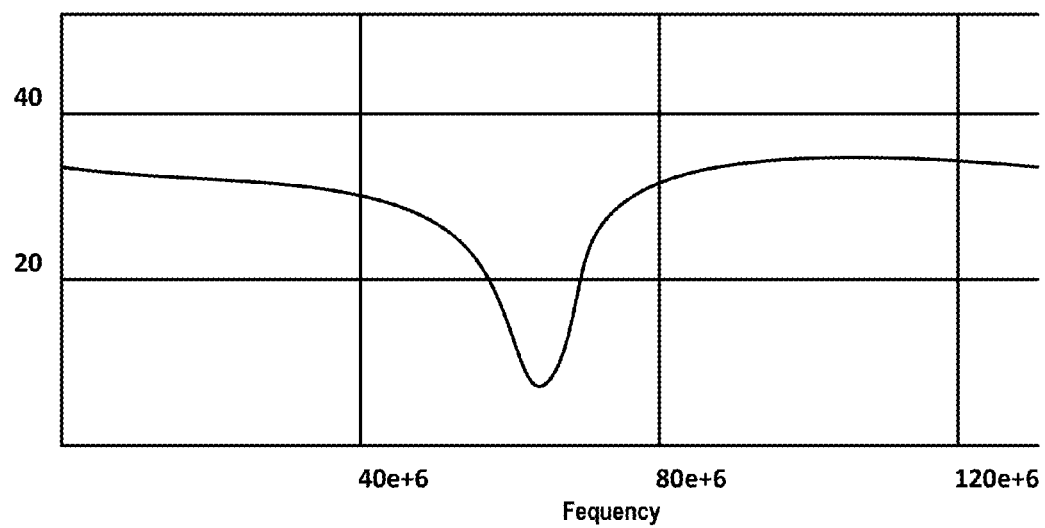
FIG. 12 is a graph illustrating calculated Voltage Standing Wave Ratio (VSWR) for an MIS tank circuit.

FIG. 12 shows the calculated VSWR of the MIS-FC circuit shown in FIG. 11 based on a source impedance of 50Ω. The VSWR has a minimum at the resonance frequency of the MIS-FC circuit, indicating the maximum power is transferred to the load at $f_R$. In this case, the VSWR has a minimum value of approximately 4, which corresponds to approximately 64% of the power transferred to the load with 36% reflected back to the power supply.

Figure 13:
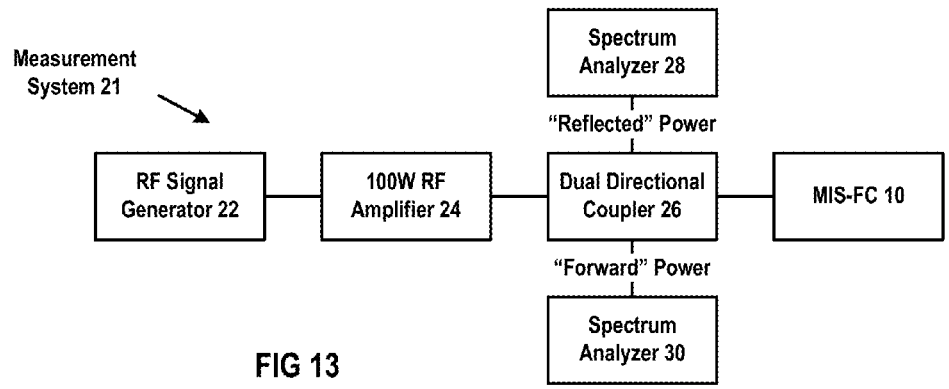
FIG. 13 is a block diagram illustrating a measurement system that carries out a VSWR procedure.
Figure 14:
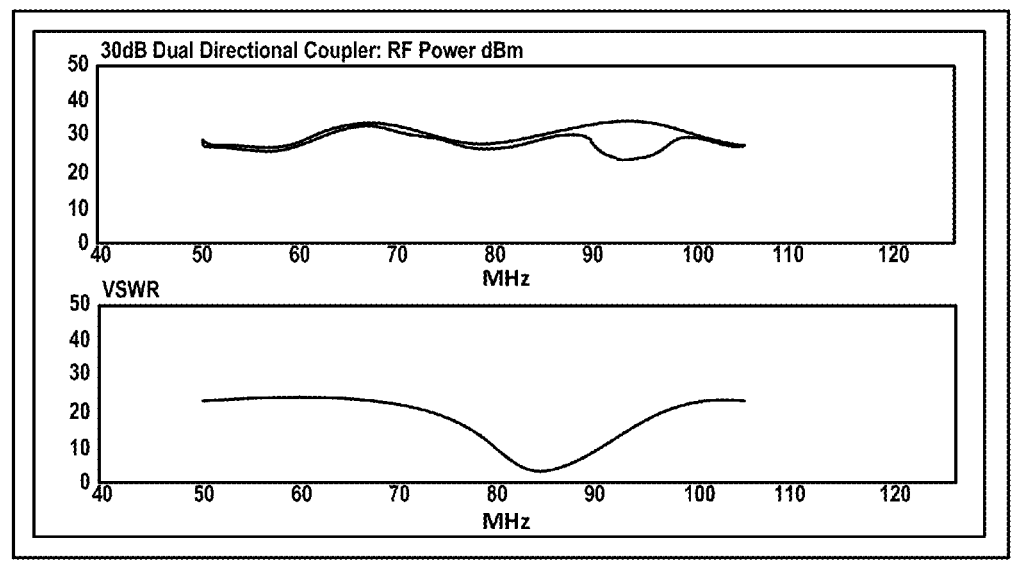
FIG. 14 is a screen shot generated by VSWR control code.

FIG. 13 shows a measurement system 21 that carries out a procedure to directly measure the VSWR of MIS-FC components in order to confirm the operation of these components for use in the MIS system. The measurement system 21 includes an RF signal generator 22, an amplifier 24, a dual directional coupler (DDC) 26, and two spectrum analyzers 28 and 30. The RF signal generator 22 drives a known RF sine wave to the amplifier 24, which is connected to the MIS-FC 10 through the DDC 26. The RF power available from the forward and reflected ports on the DDC 26 correspond to the incident and reflected power to the MIS-FC 10, which are measured by the two spectrum analyzers 28 and 30, respectively. The square root of the ratio of the reflected and incident power is equivalent to |Γ| from which the VSWR ratio is calculated. The VSWR measurements are completely automated by a control code developed specifically for the MIS system. A screen shot of the MIS-FC VSWR control code is shown in FIG. 14.

RF Flux Density Measurements of the "Solid-State" MIS-FC

Figure 15:
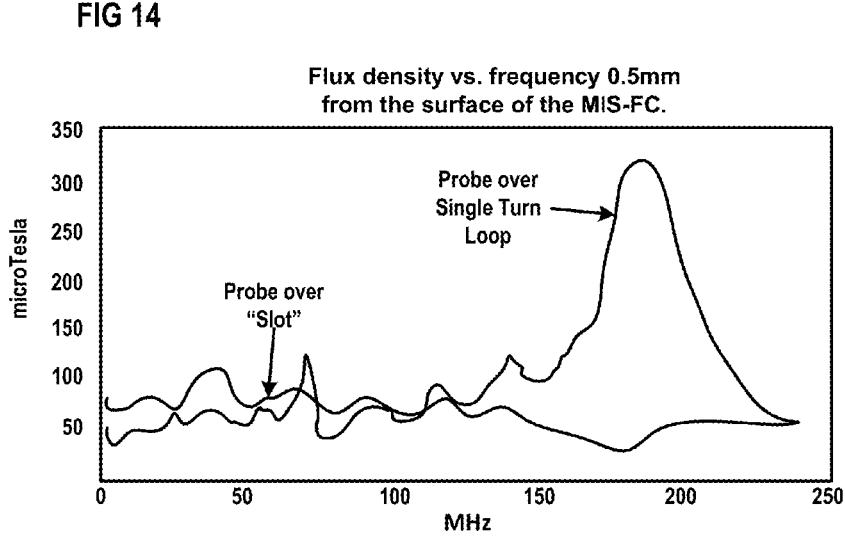
FIG. 15 is a graph showing flux density against frequency.

In addition to measuring the electrical properties of the MIS-FC and high current tank circuit, a control code is also used to measure the flux density of the MIS-FC as a function of frequency to confirm the concentration of flux density in the single turn loop of the MIS-FC. Using an RF signal generator, amplifier, and a small RF field probe (Beehive Electronics 100B Probe), we have confirmed that the high frequency magnetic field is located primarily above the single turn circular loop in the solid-state MIS-FC configuration. FIG. 15 shows the measured flux density versus frequency for a MIS-FC tank circuit with a resonant frequency of approximately 185 MHz. These data were obtained approximately 0.5 mm from the surface of the MIS-FC. The majority of the flux density is located above the circular loop, with very little flux density over the slot 14 outside of the tank circuit, thus confirming the concentration of the flux by the placement of the capacitor relative to the loop in the copper plate. Referring to Equation [2], there is nearly 40 times the power transfer over the single turn loop formed by the hole 16 as compared to the slot 14 in the MIS-FC at 185 MHz.

Figure 16:
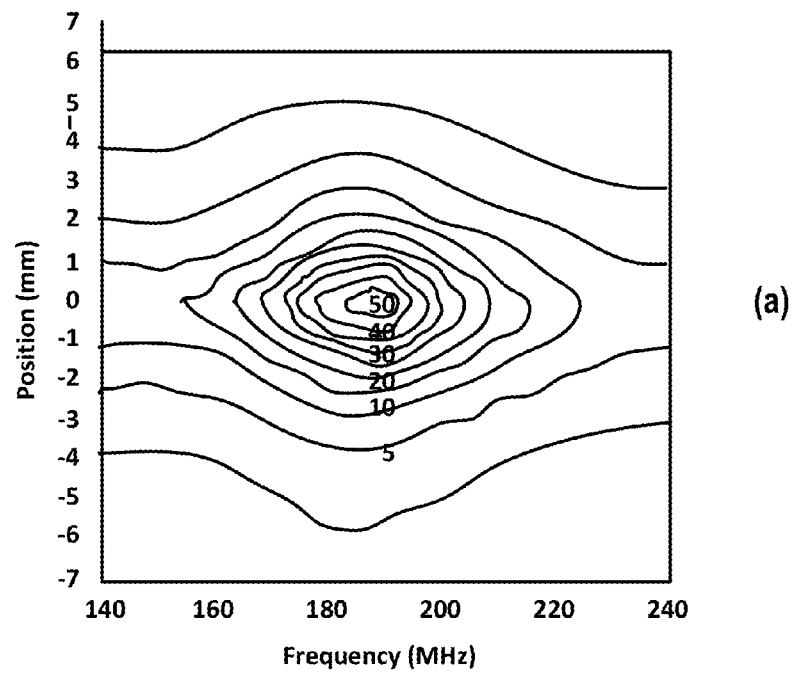
FIGS. 16a and b are top and perspective views illustrating spatial dependence of flux density against frequency.
Figure 16:
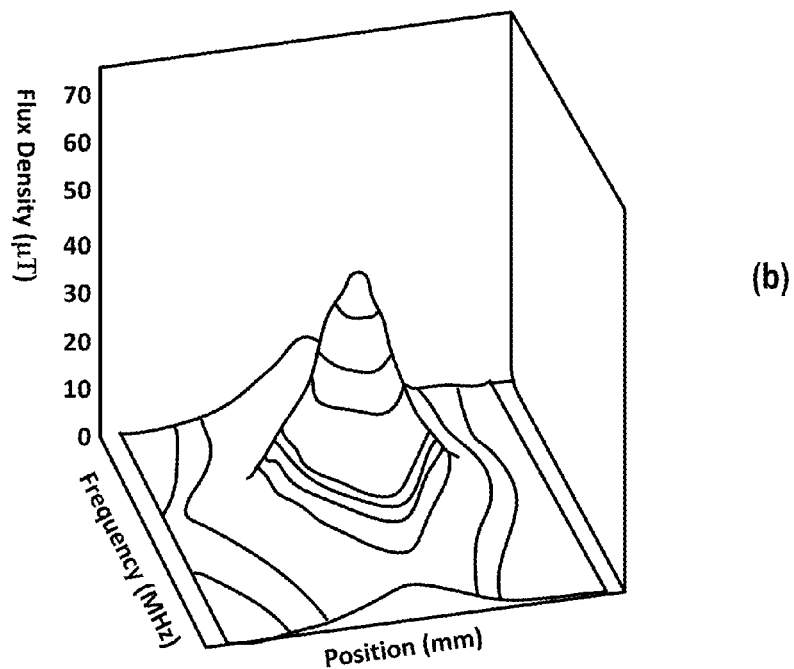

FIG. 16 shows the measured flux density as a function of frequency and position of the 185 MHz MIS-FC. The flux density is sharply peaked near the center of the loop with a full-width half-maximum of approximately 2 mm at 0.5 mm from the surface of the MIS-FC. Referring again to Equation [2], we can estimate the active heating zone to be approximately 1 mm in diameter because the power transfer by induction is proportional to the square of the flux density. This results in a very sharply peaked hot zone in the MIS-FC heating profile.

Figure 17:
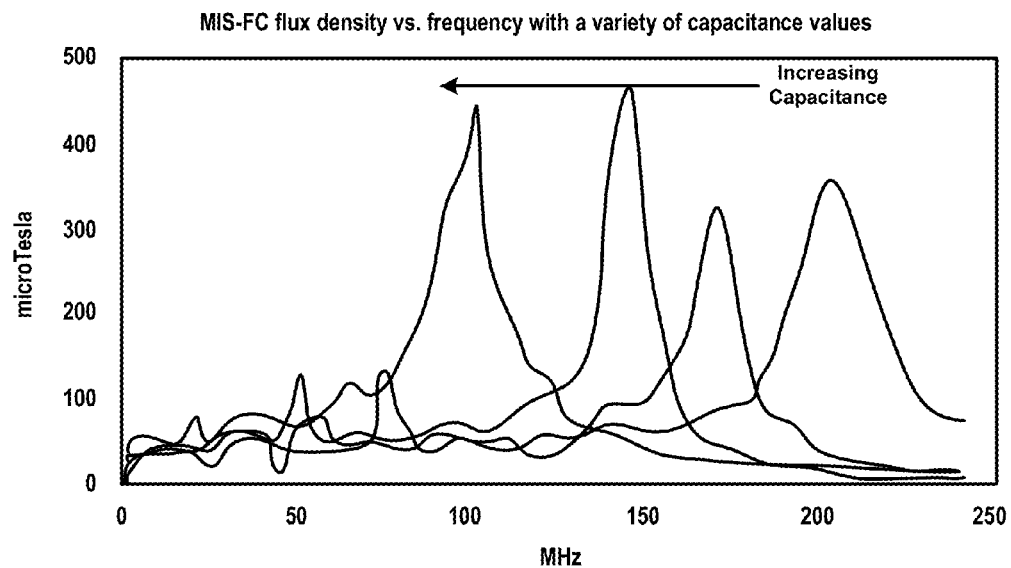
FIG. 17 is a graph illustrating flux density against frequency with a variety of capacitance values.

Early in the development of the MIS system, we focused on the development of a wide bandwidth MIS-FC as a means to couple effectively to all diameter particles in the metallic powder. While this approach is sound, in principle, it proved to be difficult to establish a low VSWR (i.e. high power transfer to the powder) over the entire bandwidth, in practice. As an alternative, the MIS-FC is designed to operate at sufficiently high frequencies such that the vast majority of particles in a given size distribution are heated by either bulk or surface heating. In this manner, a fixed parallel capacitor tank circuit can be designed specific to each powder. The resonant frequency of the MIS-FC component is easily adjusted by changing the capacitance in the tank circuit. This is illustrated in FIG. 17 that shows the measured flux density at the MIS-FC for a number of tank circuit configurations. The MIS-FC resonant frequency is seen to decrease with increasing capacitance as anticipated from Equation [4].

Figure 18:
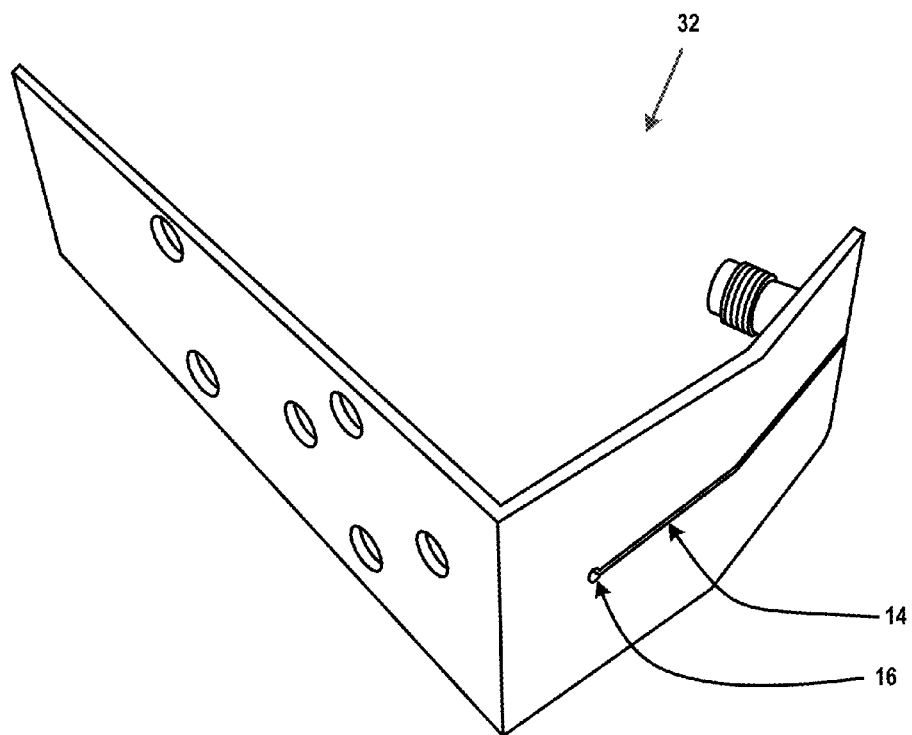
FIG. 18 is a perspective view of a print head that includes a flux concentrator according to an embodiment of the invention.

FIG. 18 shows a MIS-FC print head 32 according to an embodiment of the invention. Similar to the prototype MIS-FC 10 shown in FIG. 9, this "air-core" flux concentrator is fabricated from a 1 mm thick copper plate and consists of a thin 0.25 mm slot 14 with a 1 mm diameter hole 16 at the end. This MIS-FC design concentrates the high frequency magnetic flux within the hole 16 in the plate 12 with the appropriate matching network, and is ideal for use in close proximity to a very high temperature powder bed. The MIS-FC print head 32 is fabricated by first machining the slot and concentrator in a planar geometry, and then forming the plate into an approximate "L" geometry with a die set. The entire assembly is mounted vertically with the MIS-FC formed by the hole 16 facing down, which allows for the precise positioning of the MIS-FC above the powder bed and the easy removal and replacement of the print head, if necessary.

ScNc Powder Deposition System

Figure 19:
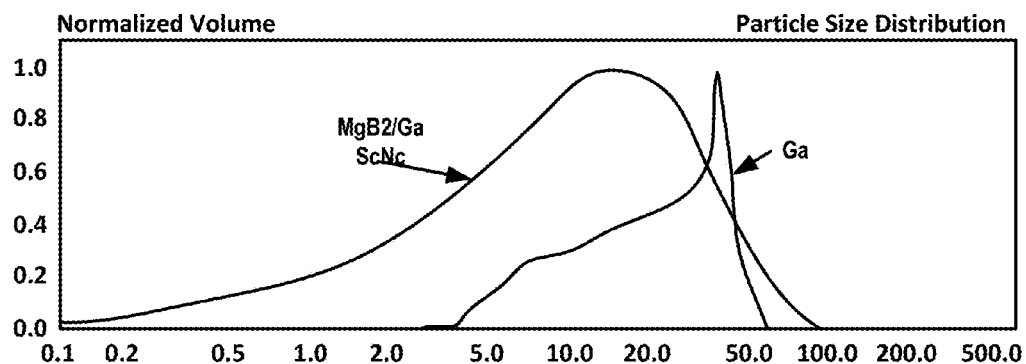
FIG. 19 is graph showing normalized particle size distribution of a Superconducting Nanocomposite (ScNc) and gallium particles.

Superconducting Nanocomposite (ScNc) powder materials consist of superconducting magnesium diboride and gallium metal prepared using a milling process that results in an intimate, homogeneous mixture of both materials. FIG. 19 shows the normalized particle size distribution of the ScNc and the gallium particles. This particular ScNc composition is 30% by volume, or approximately 50% by mass, Ga. The particle size distribution obtained through laser diffraction suggests $MgB_2$ particles as large as 100 μm, but optical analysis indicates these are agglomerates of particles will average diameters well below 50 μm.

In general, particle size, morphology, and density determine the flow characteristics of a given powder or powder mixture. These characteristics are described using a classification scheme developed by Geldart for the fluidization of powders in air driven fluidized beds, but are also useful when describing the flow properties of any powder.

Figure 20:
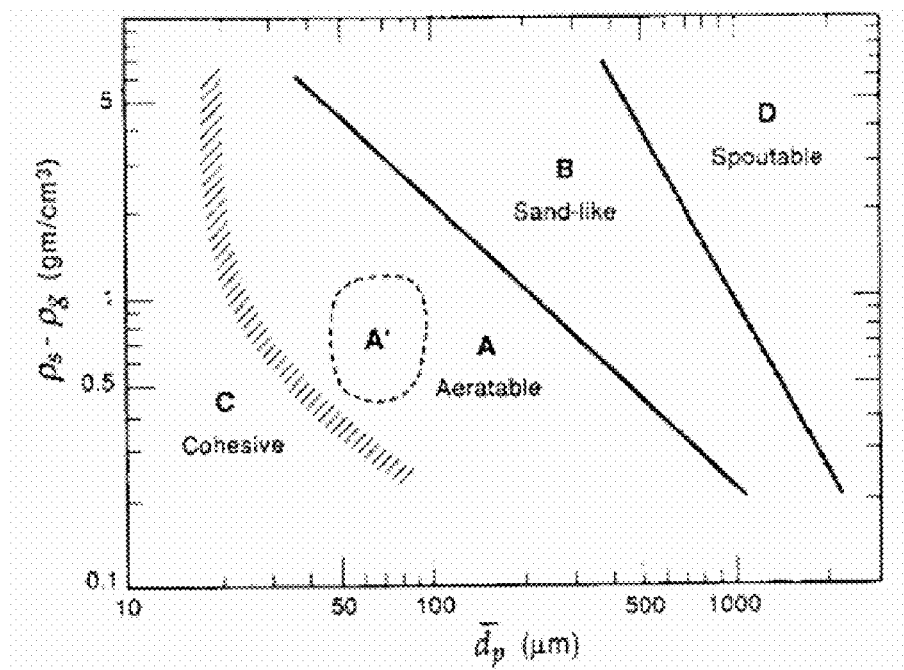
FIG. 20 is a graph showing Geldart classification for powders.

FIG. 20 shows the Geldart classification scheme for powders of a given density $\rho_S$ and particle diameter $\bar{d}_P$, where $\rho_g$ is the density of the gas used for the fluidization. Class B powders are "sand-like" and tend to fluidize and flow easily. For a given material density, however, the "flowability" of the powder decreases as the particle size decreases. In general, as the surface area of the powder increases and particle-to-particle forces dominate, the powder becomes a Geldart Class C powder, which is cohesive and possesses very poor flow properties. These flow characteristics are specific to each powder, or mixture of powders, and significantly impact the design of an effective powder delivery system for additive manufacturing.

Table 1 lists the relevant properties of ScNc powders used herein as well as some commercially available metal powders. The large particle size and moderate density of both the commercially available Al and Ti powders, for example, place these materials well within the Geldart Class B limit, as shown in FIG. 20. Because of the excellent flow characteristics of these materials, a simple mechanical screed can be used to create very uniform layers of metal powder for consolidation in an additive manufacturing system. The ScNc powder consists of very small particles with moderate to light densities, which place this composite material well within the Geldart Class (C-A) region. Unlike aluminum or titanium powders, these powders do not fluidize or flow well and thus a Geldart Class C Powder Deposition System (PDS) was designed and fabricated to manipulate The ScNc materials for use in the ScNc MIS system.

TABLE 1

| Material | Particle Size (μm) | Density (g/cm$^3$) | Geldart Class |
|---|---|---|---|
| $MgB_2$ | 1-100 | 2.57 | C: Cohesive |
| Gallium | 5-50 | 5.91 | C-A: Cohesive-Aeratable |
| Aluminum | 100-200 | 2.70 | B: Sand-like |
| Titanium | 200-400 | 4.51 | B: Sand-like |

MIS of ScNc Powder

Figure 21:
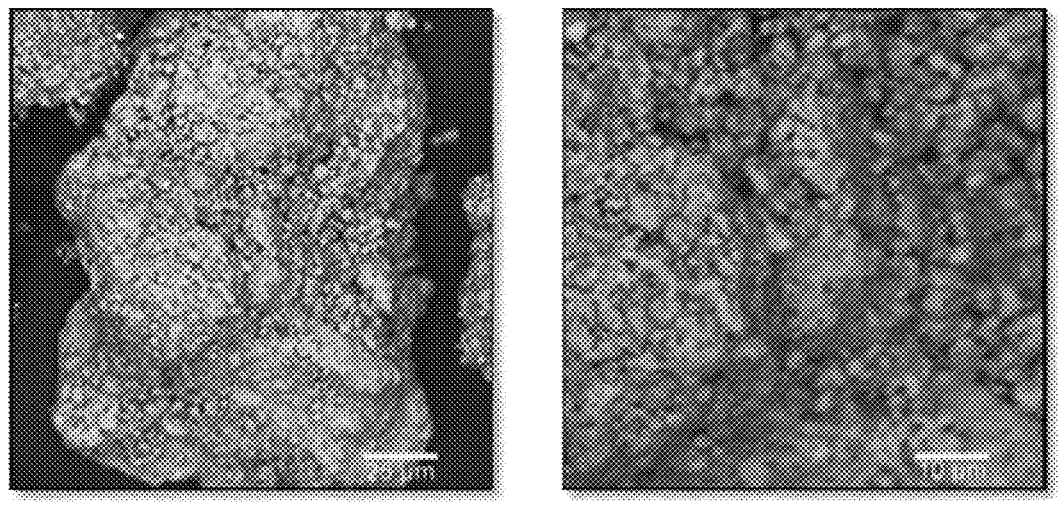
FIG. 21 shows Scanning Electron Microscope (SEM) images of a ScNc material.

FIG. 21 shows representative Scanning Electron Microscope (SEM) images of the $MgB_2$/Ga ScNc material. This particular ScNc composition is 30% by volume, or approximately 50% by mass, Ga. Though the particle size distribution obtained through laser diffraction suggests ScNc particles as large as 100 μm, SEM image analysis indicates these large particles are, in fact, agglomerates of 1 to 5 μm particles. The fact that these agglomerates consist of such small individual particles has dramatic consequences on the MIS-FC frequency. Theoretically, a 100 μm diameter spherical ScNc particle, for example, can be bulk heated using a high frequency magnetic field at approximately 180 MHz. If, however, the effective "electrical dimension" of the ScNc is much smaller than 100 μm, then the MIS-FC must be designed to operate at much higher frequencies.

Based on the observed ScNc particle/agglomerate morphology and the unknown "electrical dimension" of the ScNc powder, fabricated a series of MIS-FC assemblies and directly measured the power transfer by detecting heat from the ScNc material located over the MIS-FC. This method was very effective in determining the minimum frequency required for the ScNc MIS process. It was found experimentally that induction heating of the ScNc did not occur for frequencies less than approximately 700 MHz, which indicates that the "electrical dimension" of the ScNc is on the order of 35 μm, which is well below the physical size of the ScNc agglomerate.

Figure 22:
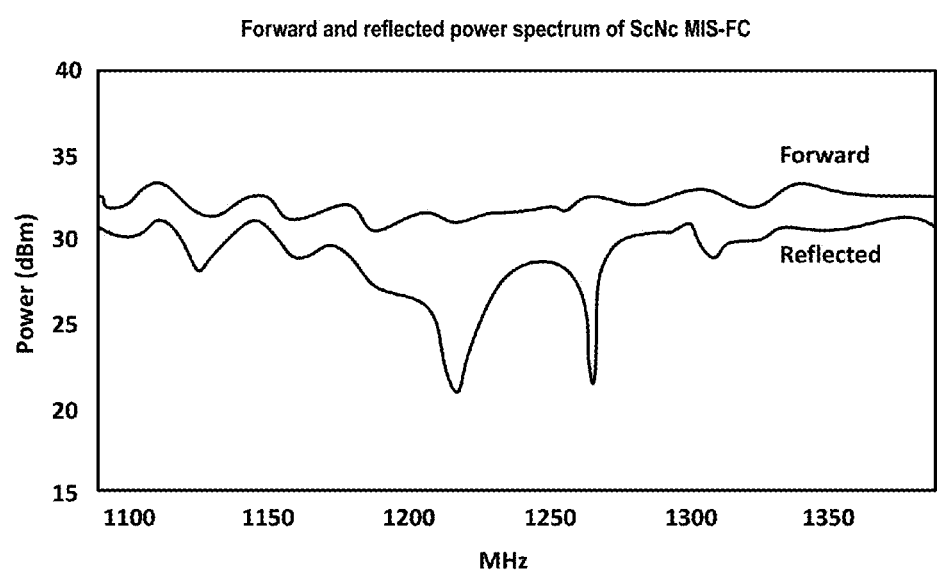
FIG. 22 is a graph showing forward and reflected power spectrum for a ScNc.

After a series of measurements with increasing resonant frequencies, we fabricated an ultra-high frequency MIS-FC suitable for ScNc materials. FIG. 22 shows the forward and reflected power spectrum of the ScNc MIS-FC with a resonant frequency of approximately 1.2 GHz. As seen in the Figure, there are many resonances in the MIS-FC circuit over this wide bandwidth. The resonance at 1229 MHz, however, corresponds to the resonance in the tank circuit associated with installed tank capacitor. The flux density only occurs at the single turn MIS-FC with an RF field probe. The measured VSWR of the MIS-FC displays a minimum of 1.87 at 1229 MHz, which corresponds to approximately 90% transfer of power to the load.

Voltage Standing Wave Ratio Spectroscopy

A particularly unique feature of the MIS process is the potential for real time diagnostics and monitoring of the sintering and consolidation of the metal particles during the additive manufacturing of a part. To illustrate this, consider the MIS tank circuit of FIG. 11 operating at a resonant frequency that couples well to a given powder. Recall that when this circuit is driven at resonance, large reactive currents flow in the tank circuit, but little real power is drawn from the amplifier if the MIS-FC is not in close proximity to the powder bed. As the MIS-FC tip is brought near the surface of the powder bed, however, real power is drawn from the RF amplifier and the metal particles are rapidly heated by induction. Essentially, the MIS-FC acts as the primary of a transformer during this process and the individual metal particles act as the secondary.

Figure 23:
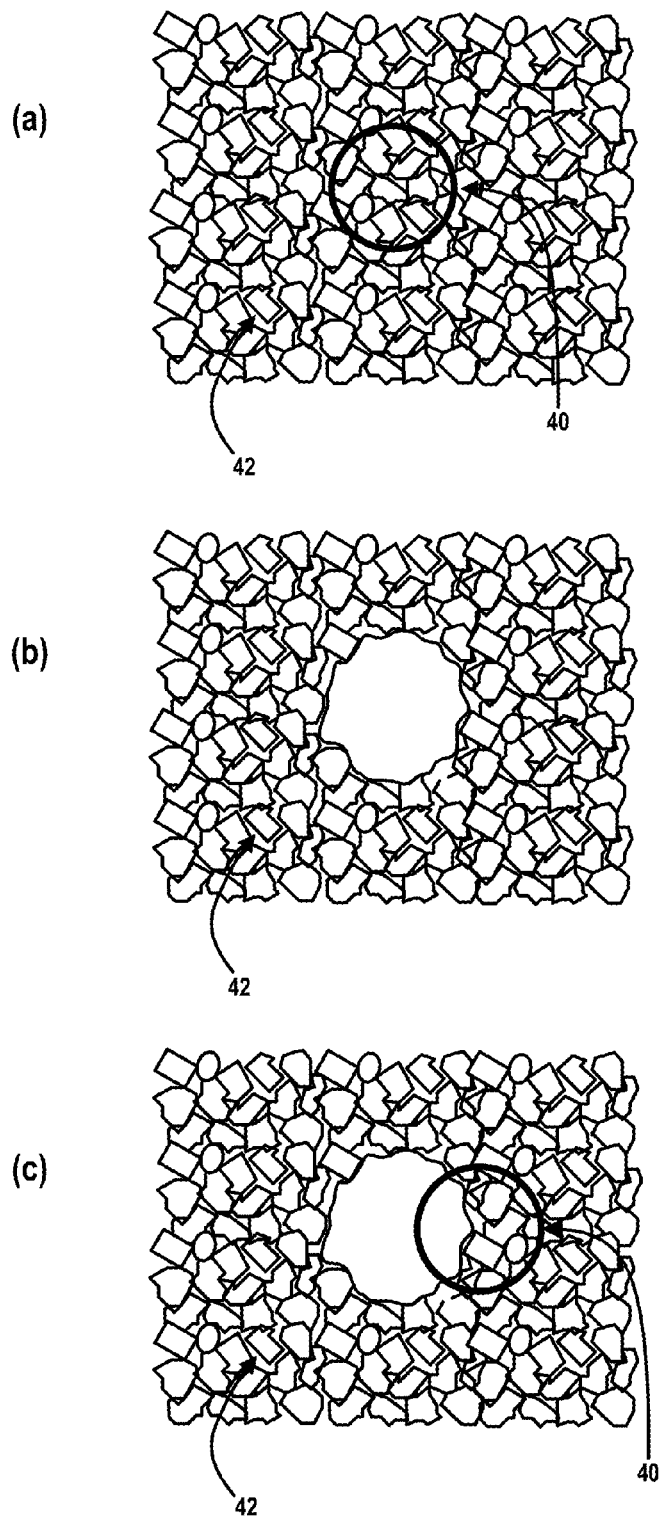
FIG. 23a to c illustrate sintering of particles.

As discussed previously, bulk heating of the particles will only occur when the diameter d of the particles is on the order of 6δ. As the particles heat and sinter together, the effective diameter increases significantly and the bulk induction heating of the individual particles transforms into the surface heating of the consolidated powder in the region of the MIS-FC tip. This is illustrated schematically in FIGS. 23a to 23c, where the circle 40 represents the spatial extent of the high frequency flux density on the surface of the powder bed 42. Note: the spatial extent of magnetic flux density on the powder bed is many times larger than the average diameter of the metal particles. When the MIS-FC is energized, the particles heat rapidly and fuse together as shown schematically in FIG. 23b. If this sintered domain is 5 to 10 times larger than the individual particles, the frequency for bulk heating of the sintered domain would be reduced by 25 to 100 times (see Equation [3]). Thus, as the metal particles fuse together during the MIS process, the power flow at high frequencies to the MIS-FC is significantly reduced due to the dramatic increase in the effective "electrical dimension" d/δ. Real power will only flow to the powder bed via the MIS-FC as it moves over new, un-sintered particles, as shown in FIG. 23c. This provides a real time measurement of the quality of the consolidation of the particles during the MIS process.

Figure 24:
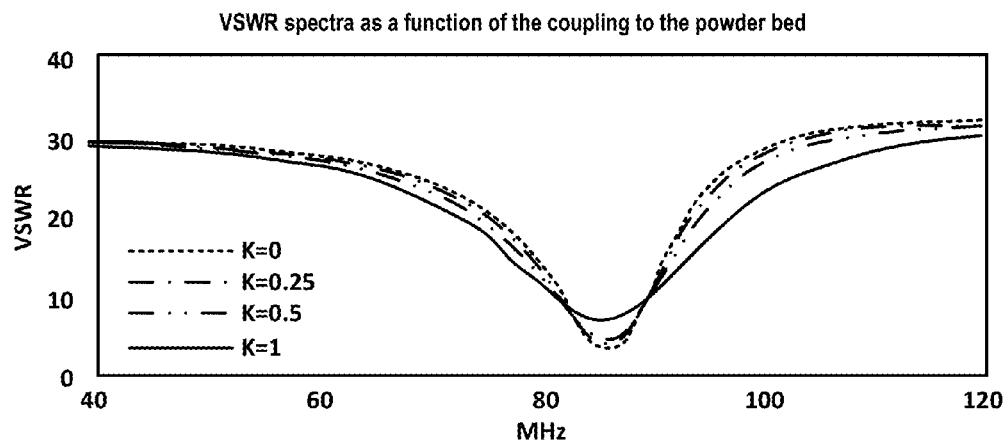
FIG. 24 is a graph showing calculated VSWR's for a particular tank circuit.
Figure 25:
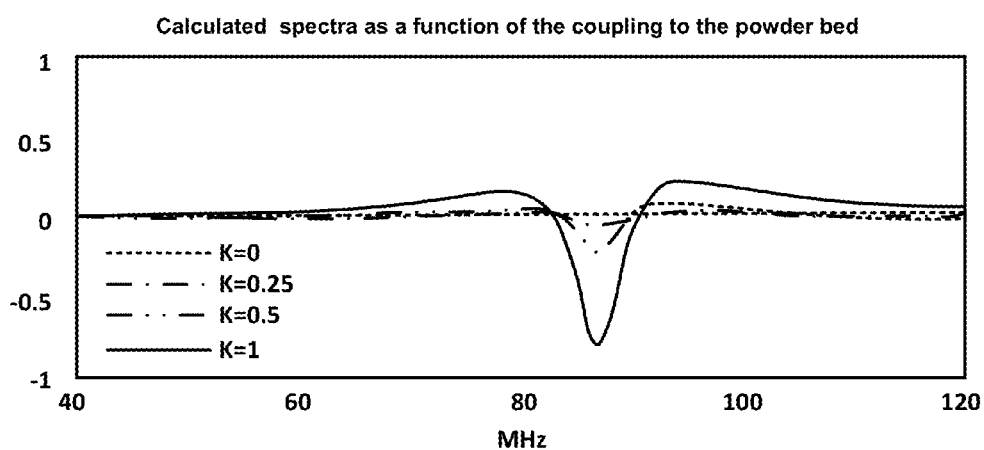
FIG. 25 shows the calculated VSWR ratio θ as a function of coupling M.

FIG. 24 shows calculated VSWRs for a MIS-FC tank circuit with a resonant frequency of approximately 86 MHz and increasing values of the coupling M The overall shape of the VSWR changes as M increases. As discussed previously, changes in M reflect changes in the degree of coupling between the powder and the MIS-FC, which will occur when the MIS-FC passes over individual particles or fused particles. In order to emphasize the changes in the VSWR with increased coupling, we define a normalized VSWR ratio θ as:

$$\theta = 1 - \left(\frac{VSWR_{K>0}}{VSWR_{K=0}}\right), \quad [7]$$

where $VSWR_{K>0}$ is the VSWR of the MIS-FC circuit when it is coupled to the powder bed, and $VSWR_{K=0}$ is the VSWR of the MIS-FC circuit when it is completely de-coupled from the powder bed. Similar to the VSWR, this normalized quantity is also independent of the level of RF power incident on the MIS-FC. Note that θ is unity if there is no coupling to the powder bed for all frequencies. FIG. 25 shows the calculated θ as a function of coupling M for the VSWRs shown in FIG. 24. As anticipated, there is considerable structure in θ with increasing coupling of the RF power to the powder bed.

Figure 26:
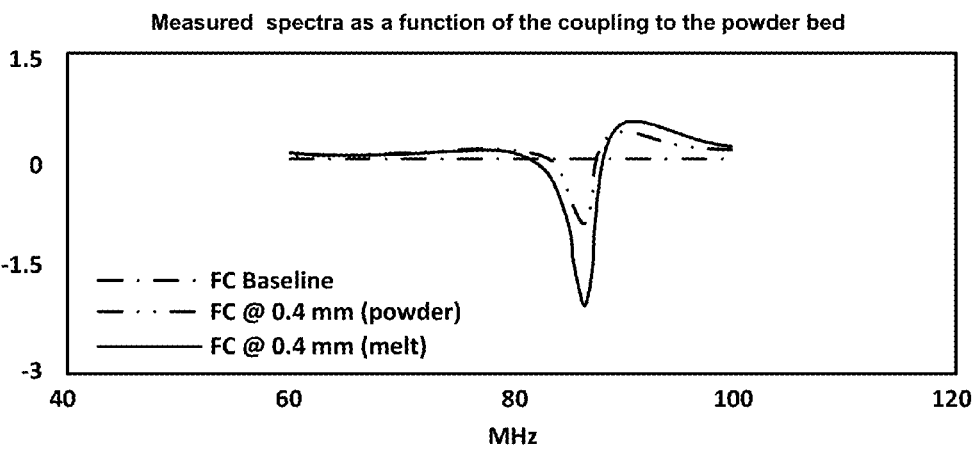
FIG. 26 is a graph showing the result of real-time monitoring of an additive manufacturing process and that indicates the normalized ratio of the VSWR's during an MIS process.

FIG. 26 shows the results of real time monitoring of the additive manufacturing process that indicate the normalized ratio of the VSWRs during the MIS process can be used to monitor the degree of sintering and consolidation of the particles. This method of non-destructive evaluation is called Voltage Standing Wave Ratio Spectroscopy.

In addition to the high frequency VSWR spectroscopy, auxiliary low frequency induction heaters located near the MIS-FC assembly could be used to probe the quality of the consolidation over larger length scales and to locally heat treat the part during fabrication to reduce the mechanical stress on the part.

Figure 27:
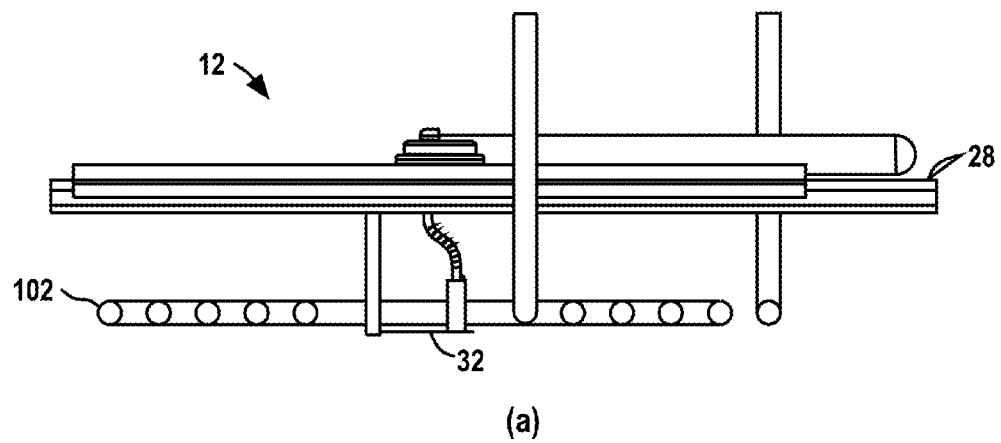
FIGS. 27a and b are partially cross-sectioned side and perspective views of a sintering apparatus according to an embodiment of the invention.
Figure 27:
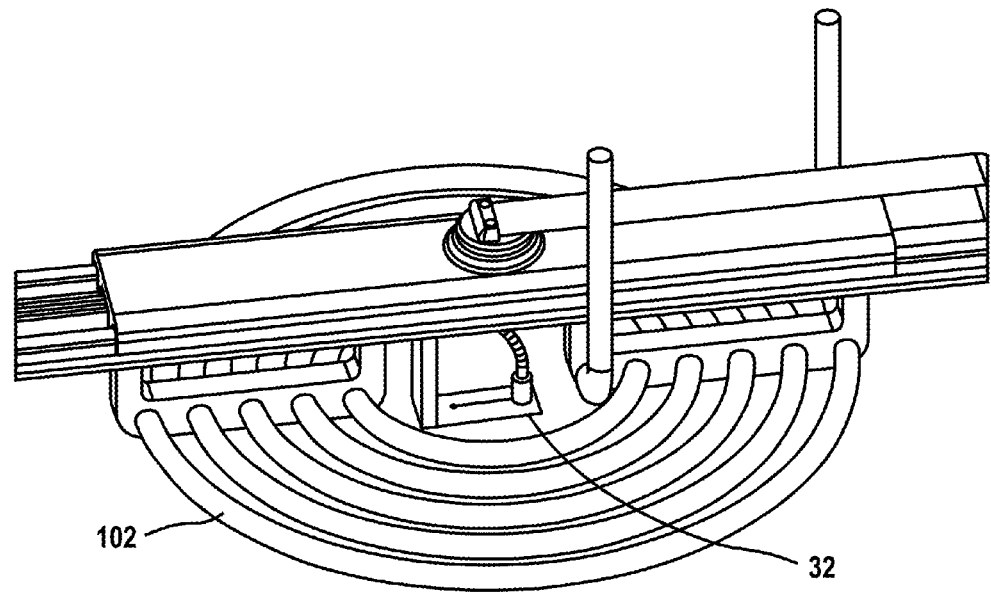

FIGS. 27a and 27b show an embodiment where a localized heater in the form of the print head 32 with high frequency flux concentrator is in the middle of bulk heater in the form of a larger, low frequency induction coil 102. The low frequency coil 102 is used to heat the consolidated part in preparation for the sintering of the powder by the high frequency flux concentrator that when the particles sinter into a larger unit, the increased domain size leads to inefficient surface heating. The high frequency of the flux concentrator of the print head 32 is not ideal for bulk heating. The low frequency, spatially disperse flux concentrator (i.e. the induction coil) can be used to heat the macroscopic part, reduce thermal and mechanical stress, and reduce the amount of power required for the initial powder consolidation.

The low frequency coil 102 is driven by its own electric current generator (not shown) and exposes the part to an alternating magnetic field generated by the alternating electric current. The high frequency of the flux concentrator of the print head 32 heats only a portion of the particles that are in contact with the part so that the particles of the portion join with the part. The alternating electric current for pre-heating the part is a low frequency alternating electric current that exposes the part to a low frequency alternating magnetic field. The alternating current for heating the particles is a high frequency alternating electric current that exposes a portion of the particles that are in contact with the part to a high frequency alternating magnetic field.

Figure 28:
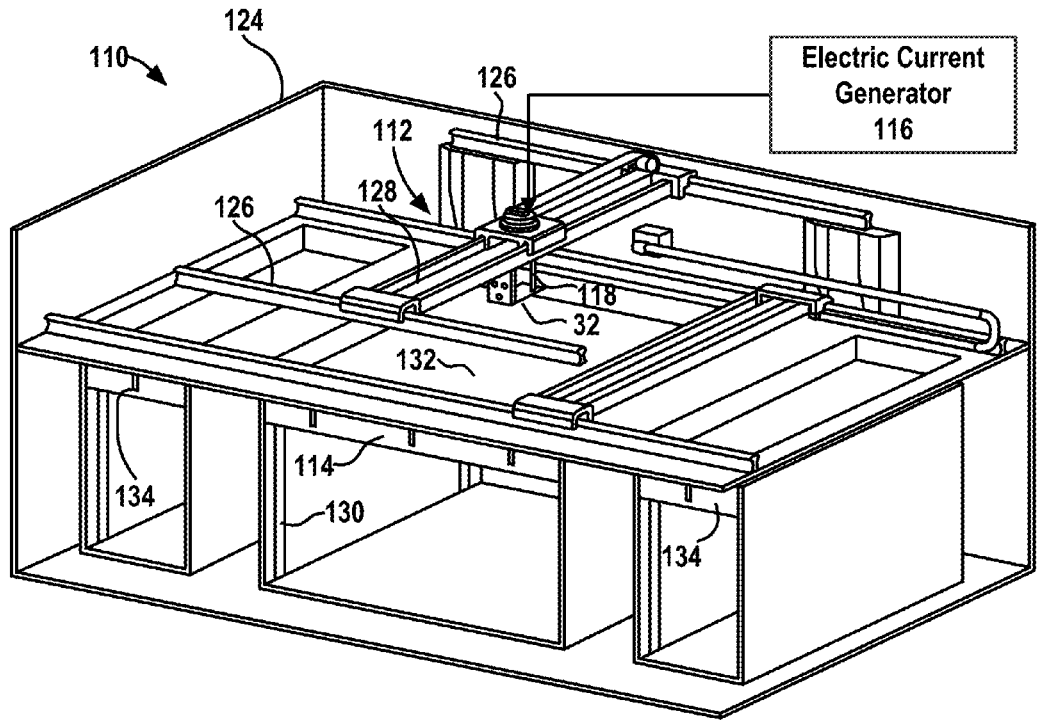
FIG. 28 is a perspective view of the sintering apparatus.

FIG. 28 illustrates an MIS apparatus 110 according to an embodiment of the invention. The apparatus 110 includes a system 112 for creating relative movement in three-dimensions, a container 114, an electric current generator 116, a high frequency electric lead 118, and the print head 32. The entire apparatus 110 resides in a controlled atmosphere environment.

The system 112 includes a frame 124, first and second tracks 126, a boom 128, and a plurality of rails 130. The tracks 126 are mounted to the frame 124 on opposing sides thereof and extend in an x direction. The boom 128 is mounted between the rails 130 and extends in a y direction. The boom 128 is movable in the x direction on the rails 130. An actuator (not shown) moves the boom 128 horizontally on the rails 130 in the x direction. The print head 32 is mounted to the boom 128 for movement in the y direction on the boom 128. An actuator (not shown) moves the print head 32 horizontally on the boom 128 in the y direction.

The container 114 is a horizontal bed with sides for containing and holding small particles 132 that contact one another. The rails 130 extend in a vertical z direction. The container 114 is mounted to the rails 130 for movement up and down in the vertical z direction. An actuator (not shown) moves the container 114 up and down the rails 130 in the vertical z direction.

The apparatus 110 further includes two powder reservoirs 134. The powder reservoirs 134 are also movable in a vertical z direction. By raising the powder reservoirs 134 and/or lowering the container 114, a height differential can be created between the particles 132 in the container 114 and particles held in the powder reservoir 134 so that particles can be scraped from the powder reservoirs 134 into and over the particles 132 already in the container 114.

It can thus be seen that the system 112 provides for movement in three-dimensions of the print head 32 relative to the particles 132. In use, a thin layer of particles 132 is scraped from the reservoirs 134 onto the container 114. The electric current generator 116 is connected through the lead 118 to the print head 32. When the electric current generator 116 is operated, it generates an alternating electric current and provides the alternating electric current through the lead 118 to an area adjacent the print head 32. The print head 32 is held close to the particles 132 and focuses an alternating magnetic field generated by the alternating magnetic current within a small first portion of the particles 132. The alternating magnetic field heats the particles so that they join. Joining of the particles occurs due to sintering and or melting of the material. The flux concentrator is then moved in x and/or y directions so that the alternating magnetic field is reduced from the first portion of the particles while exposing a second, adjacent portion of the particles to the alternating magnetic field. A reduction in the alternating magnetic field strength at the first portion of particles that has been joined allows the first portion to cool. In reality, there is a transition from the first portion to the second portion, and then to a third portion and so on so that an elongate part can be formed. The elongate part can have a two-dimensional profile in x and y directions.

After the part is formed within the particles 132, the container 114 is lowered and a new layer of particles is scraped onto the particles 132 from the reservoirs 134. The process hereinbefore described is then repeated. The particles that are heated in the second cycle are not only fused to one another, but are also fused to the part that has been manufactured in the first cycle. Should a circular plate for example be manufactured during the first cycle, the second cycle will add another layer to the circular plate and if the process is repeated, a cylinder may be manufactured. It may also be possible to manufacture more complex, three-dimensional shapes in this manner.

Figure 29:
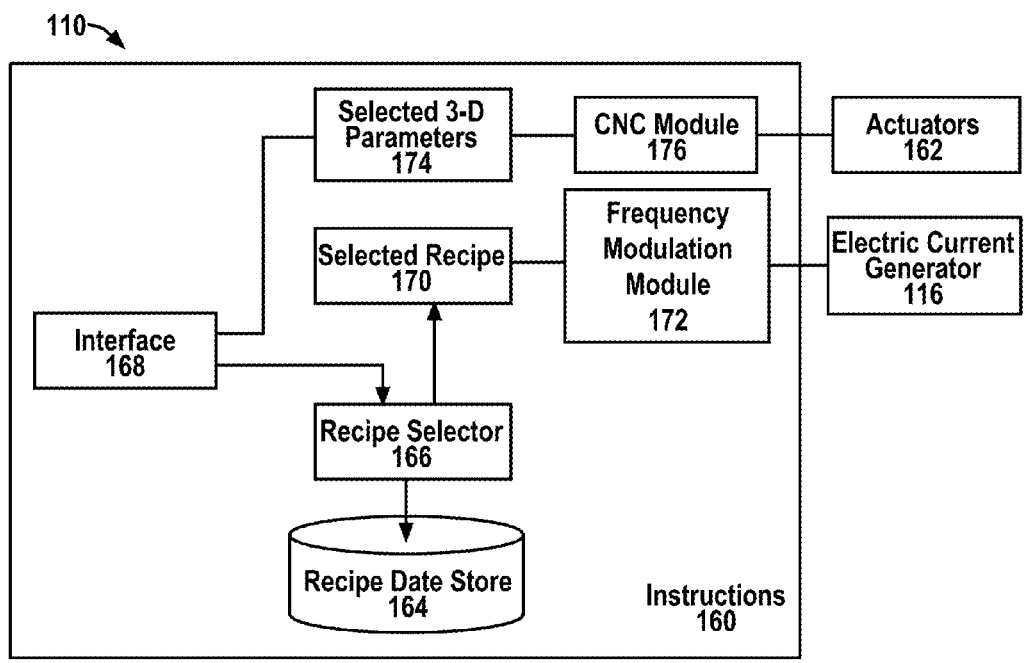
FIG. 29 is a block diagram illustrating instructions forming part of the apparatus of FIG. 28.

FIG. 29 illustrates further components of the apparatus 110 shown in FIG. 28, including instructions 160 that are executable by a processor of a computer, actuators 162 to cause movement in x, y and z directions of the print head 32 relative to the particles 132, and an electric current generator 116.

The instructions 160 include a recipe data store 164, a recipe selector 166, an interface 168, a selected recipe 170, a frequency modulation module 172, selected 3D parameters 174, and a CNC module 176.

In use, an operator can view the interface 168 on a display device. The interface 168 gives the operator access to the recipe selector 166 and the selected 3D parameters 174. The recipe selector 166 includes inputs for materials and particle sizes. A plurality of recipes are stored in the recipe data store 164. The recipe selector 166 selects one of the recipes in the recipe data store 164 based on the input provided by the operator through the interface 168. The recipe that is selected by the recipe selector 166 is then stored as the selected recipe 170.

The operator also enters 3D parameters through the interface 168, for example the manufacture of a cylinder as hereinbefore described. The parameters that are entered by the operator are then stored as the selected 3D parameters 174. The frequency modulation module 172 then utilizes the parameters of the selected recipe 170, including frequency, to modulate a frequency generated by the electric current generator 116. The CNC module 176 simultaneously operates the actuators 162 to create a desired two-dimensional, and ultimately three-dimensional part.

Figure 30:
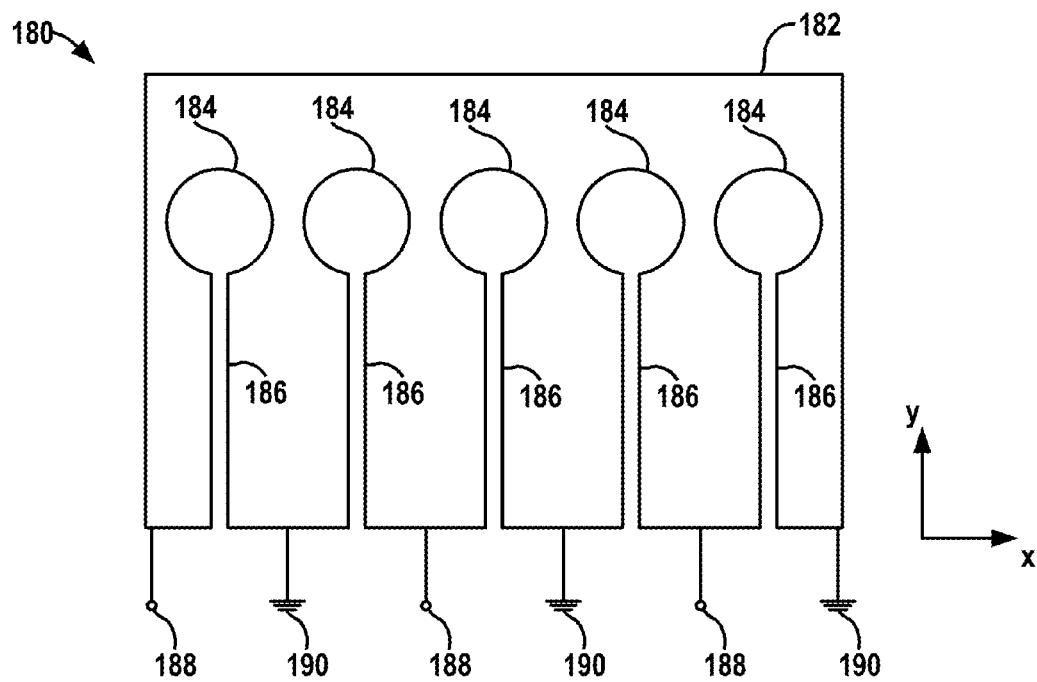
FIGS. 30 and 31 show print heads according to alternate embodiments of the invention that allow for bulk manufacture.

FIG. 30 shows a print head 180 comprising a plate 182 with a plurality of holes 184 and slots 186. Each hole 184 and slot 186 is as hereinbefore described with reference to FIG. 9. Each hole 184 thus forms a respective flux concentrator. One terminal of a flux concentrator forms an electric current terminal 188 and an opposite terminal is connected to ground 190. The holes 184 are located in a single row that extends in an x-direction.

Figure 31:
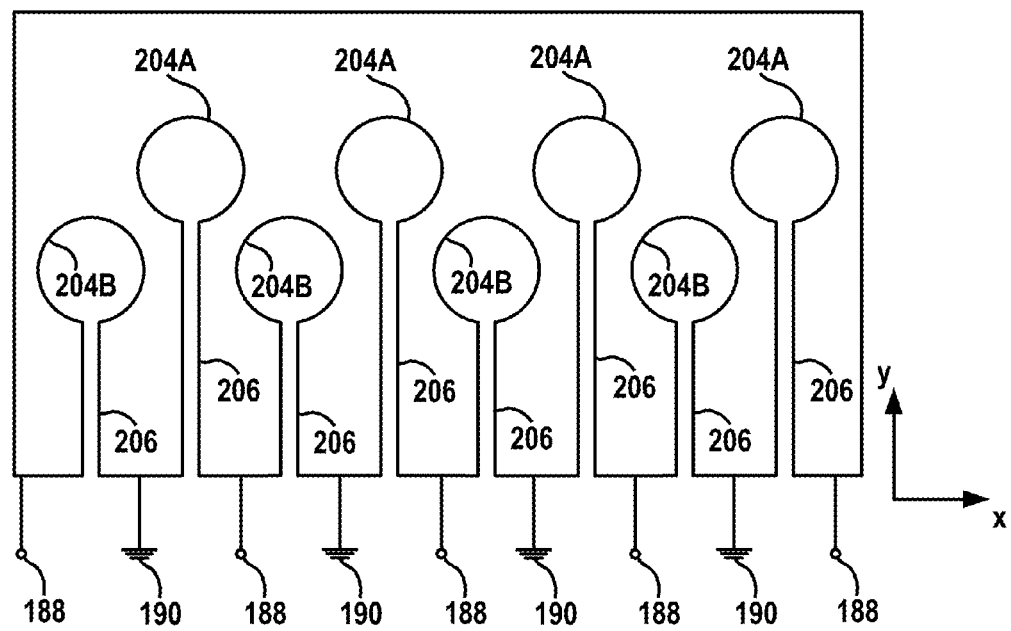
Figure 32:
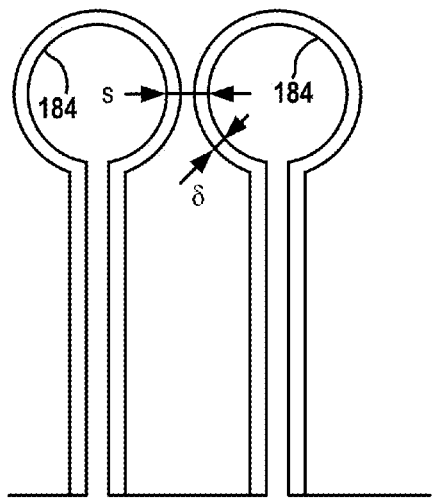
FIGS. 32 and 33 are enlarged views of FIGS. 30 and 31 showing the spacing and location of skin depth.

FIG. 31 shows a print head, according to another embodiment of the invention, having a plate 202 with holes 204A and B and slots 206. The holes 204A are located in a first row extending in an x-direction. The holes 204B are located in a second row extending in an x-direction. The second row of holes is offset from the first row of holes in a y-direction. As shown in FIG. 32, current flows within a skin depth δ. The distance within the metal at which the current is reduced by approximately 37% of the value at the surface is called the skin depth δ and can be written as:

$$\delta = \sqrt{\frac{\rho}{\pi f \mu}} \quad [8]$$

ρ is the resistivity of the material of the plate,
μ is the permeability of the material of the plate; and
f is the frequency of the magnetic field.

Figure 33:
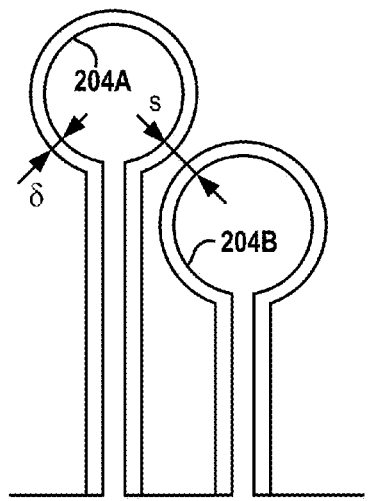

The holes 184 are spaced from one another by a distance s. In order for the currents of the holes 184 to remain separate from one another, s≥2δ. In FIG. 32, s is measured in a y-direction. In FIG. 33, s is the closest distance between adjacent ones of the holes 204A and B.

In general, each flux concentrator heats a respective region of the underlying part or parts. A respective heat affected zone is thereby created in the respective region where atom movement causes a change in a property of a material the part or parts. The material may or may not melt. A plurality of particles may be sintered together due to migration of atoms between the particles, which is an example of a non-melting change in properties of a material. A non-melting change in properties of a material may include a change in microstructure of the material. Such a change in microstructure may for example include a phase change of the material wherein a crystal structure of the material is changed. Such a change in crystal structure may involve a change in lattice structure with or without the inclusion of additional or replacement atoms or may include the inclusion or replacement of atoms without a change in the lattice structure. A phase change may involve a change in the grain size.

Figure 34:
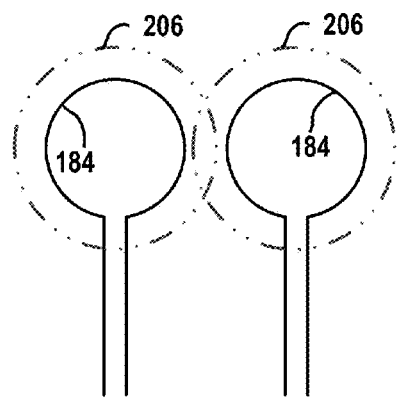
FIGS. 34 and 35 illustrate heat affected regions where phase change occurs.
Figure 35:
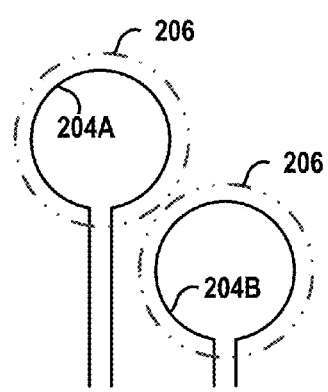

As shown in FIGS. 34 and 35, the alternating magnetic fields created by the holes 184 and 204A and B create heat affected regions 206 within the underlying part or parts such as particles that are larger than the holes 184 and 204A and B.

Figure 36:
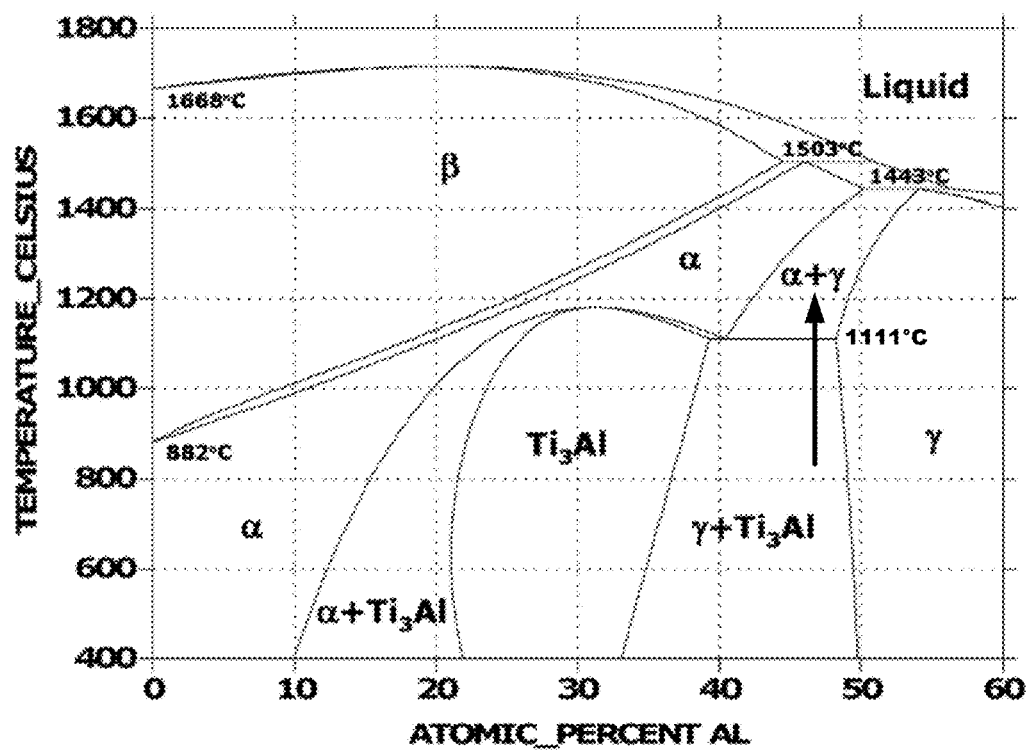
FIG. 36 is a Ti—Al phase diagram that includes a phase change at 1111° C. of Ti-48 Al-2 Cr-2 Nb.

FIG. 36 shows, by way of example, a Ti—Al phase diagram to illustrate an example of a phase change in the material. A composition of Ti-48 Al-2 Cr-2 Nb (48% aluminum) has a phase change at 1111° C. Below 1111° C., the composition is a mixture of γ and Ti₃Al. Above 1111° C., the composition consists of solid α and solid γ without having been melted. A subsequent quenching to below 1111° C. will render a composition of α and γ only.

Figure 37:
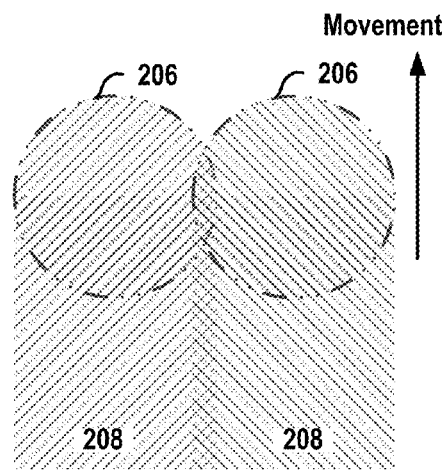
FIGS. 37 and 38 show trailing paths of the regions in FIGS. 34 and 35, respectively, where phase change has occurred.

As shown in FIG. 37, the regions 206 that are formed due to the holes 184 in FIG. 34 are simultaneously moved in a y-direction i.e., at right angles to the rows of holes 184 shone in FIG. 34. Each region 206 leaves a respective trailing path 208 where the phase change has happened. The trailing path 208 of the region 206 on the left is cross-hatched from bottom left to top right and the trailing 208 of the region 206 on the right is cross-hatched from bottom right to top left. Because the regions 206 overlap, and are in-line with one another in an x-direction, the trailing paths 208 also overlap. There is thus no break between the trailing paths 208 where the phase change did not occur.

Figure 38:
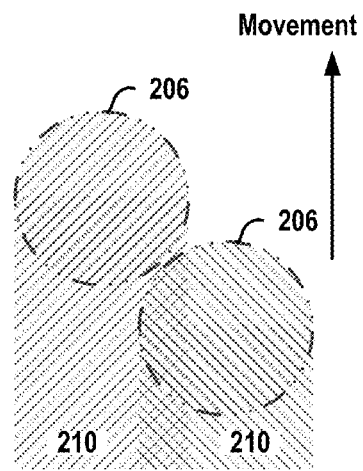

FIG. 38 shows the regions 206 where phase change occurs due to the holes 204A and B in FIG. 35. Each region 206 forms a respective trailing path 210 where phase change has occurred. The trailing paths 210 overlap one another. Because the holes 204A and B are offset in both an x- and a y-direction, there is no need for the regions 206 to overlap at any particular moment in time.

In one example, the power supply can provide the same alternating electric current to the terminals 188 in FIGS. 30 and 31. Alternatively, different alternating electric currents can be provided to one or more of the terminals 188 in order to optimize parallel consolidation based on materials properties such as density, microstructure, fracture toughness, etc. Such parallel consolidation conditions may include:

Simultaneous and Time-delayed excitation of adjacent flux concentrators;
Unequal duty cycles of adjacent flux concentrators;
Simultaneous and Time-delayed excitation of next nearest-neighbor flux concentrators;
Unequal duty cycles on next nearest-neighbor flux concentrators;
Flux concentrator diameter (e.g. equal or mixed diameter of flux concentrators in an array); and
Flux concentrator consolidation points operating a different frequencies.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art. A system has been described that uses relative movement of flux concentrators to create overlapping heat affected zones. Another system may not make use of relative movement without departing from the scope and spirit of the inventions. A static system may for example make use of an array of flux concentrators that create an array of heat affected zones. Although an array is generally rectangular, other layouts may be used depending on the intended purpose.

What is claimed:

1. A method comprising:
holding a plurality of flux concentrators and at least one part in proximity to one another, the flux concentrators being connected to at least one electric current generator;
generating at least a first alternating electric current by the at least one electric current generator to generate a plurality of alternating magnetic fields by the respective flux concentrators, each respective alternating magnetic field heating a respective region of the at least one part to create a respective heat affected zone in the respective region where atom movement causes a change in a property of a material of the at least one part, the respective heat affected zones created by respective flux concentrators overlapping one another, wherein the flux concentrators are formed by respective holes in a plate, the holes being spaced from one another by a spacing s, wherein
s≥2δ, and $$\delta = \sqrt{\frac{\rho}{\pi f \mu}}$$

ρ is the resistivity of the material of the plate,
μ is the permeability of the material of the plate; and
f is the frequency of the magnetic field.

2. The method of claim 1, further comprising:
generating least first and second different alternating electric currents by the at least on electric current generator, each electric current generating a respective one of the alternating magnetic fields.

3. The method of claim 1, further comprising:
moving the flux concentrators in unison relative to the at least one part to create trailing paths of the regions that have been heated by the respective alternating magnetic fields that overlap one another.

4. The method of claim 3, wherein the holes are in a row at right angles to the relative movement.

5. The method of claim 4, wherein the holes are in at least two rows.

6. The method of claim 1, wherein the material does not melt.

7. The method of claim 6, wherein the at least one part includes a plurality of particles that are sintered together due to migration of atoms between the particles.

8. The method of claim 6, wherein the change in the property of the material includes a change in a microstructure of the material.

9. The method of claim 8, wherein the material undergoes a phase change.

10. The method of claim 9, wherein the material undergoes a change in crystal structure of the material.

11. The method of claim 8, wherein the material undergoes a change in grain size.

12. The method of claim 1, wherein the material melts.

13. The method of claim 1, wherein the holes are round.

* * * * *